(12) United States Patent
Perkins et al.

(10) Patent No.: US 10,718,881 B2
(45) Date of Patent: Jul. 21, 2020

(54) INTEGRATED COMPUTATIONAL ELEMENTS WITH LATERALLY-DISTRIBUTED SPECTRAL FILTERS

(71) Applicant: Halliburton Energy Services, Inc., Houston, TX (US)

(72) Inventors: David L. Perkins, Conroe, TX (US); Li Gao, Katy, TX (US); Michael T. Pelletier, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 157 days.

(21) Appl. No.: 14/900,107

(22) PCT Filed: Jul. 9, 2013

(86) PCT No.: PCT/US2013/049697
§ 371 (c)(1),
(2) Date: Dec. 18, 2015

(87) PCT Pub. No.: WO2015/005905
PCT Pub. Date: Jan. 15, 2015

(65) Prior Publication Data
US 2016/0139296 A1    May 19, 2016

(51) Int. Cl.
*G01V 8/12*       (2006.01)
*G01N 21/27*     (2006.01)
(Continued)

(52) U.S. Cl.
CPC .............. *G01V 8/12* (2013.01); *E21B 47/102* (2013.01); *E21B 49/087* (2013.01);
(Continued)

(58) Field of Classification Search
CPC ........ G01J 3/02; G01J 3/28; G01J 3/42; G01J 3/10; G01J 3/2823; G01J 3/0291;
(Continued)

(56) References Cited

U.S. PATENT DOCUMENTS 3,971,065 A    7/1976   Bayer
5,075,550 A    12/1991  Miller et al.
(Continued)

FOREIGN PATENT DOCUMENTS

EP    1969326    9/2008
EP    2087328    8/2009
(Continued)

OTHER PUBLICATIONS

Authorized officer Ahn, Jae Yul, International Search Report and Written Opinion for PCT/US2013/049697, dated Apr. 11, 2014, 11 pages.
(Continued)

*Primary Examiner* — Mohamed K Amara
(74) *Attorney, Agent, or Firm* — John W. Wustenberg; Parker Justiss, P.C.

(57) ABSTRACT

Technologies for providing optical analysis systems using an integrated computational element with laterally-distributed spectral filters are described. A measurement tool contains an optical element including a substrate and a plurality of spectral filters supported by the substrate and arranged at different lateral positions with respect to a path of light to be received from a sample during operation of the measurement tool. Each spectral filter is formed to transmit or reflect a different subset of wavelengths in a wavelength range. Additionally, each spectral filter has a respective area exposed to the light from the sample, such that the respective areas are related to a property of the sample. The wavelength range can include wavelengths in a range from about 0.2 μm
(Continued)

to about 25 µm. Additionally, the sample can include well-bore fluids and the property of the sample is a property of the well-bore fluids.

27 Claims, 7 Drawing Sheets

(51) Int. Cl.
  *E21B 47/10* (2012.01)
  *G01J 3/457* (2006.01)
  *G01J 3/28* (2006.01)
  *G01J 3/02* (2006.01)
  *E21B 49/08* (2006.01)

(52) U.S. Cl.
  CPC ............. *G01J 3/0205* (2013.01); *G01J 3/28* (2013.01); *G01J 3/457* (2013.01); *G01N 21/27* (2013.01); *G01N 2201/061* (2013.01); *G01N 2201/12* (2013.01)

(58) Field of Classification Search
  CPC ........ G01J 3/457; G01J 3/0205; G01N 21/31; G01N 21/359; G01N 21/552; G01N 21/3563; G01N 21/3577; G01N 21/6456; G01N 21/253; G01N 21/3504; G01N 2201/1293; G01N 21/27; G01N 2201/061; G01N 2201/12; G01V 8/12; E21B 49/087; E21B 47/102
  See application file for complete search history.

(56) References Cited

U.S. PATENT DOCUMENTS

| | | | |
|---|---|---|---|
| 5,399,229 A | 3/1995 | Stefani et al. | |
| 5,408,101 A * | 4/1995 | Wong | G01J 3/10 250/493.1 |
| 5,453,716 A | 9/1995 | Person et al. | |
| 5,537,479 A | 7/1996 | Kreisel et al. | |
| 5,619,366 A | 4/1997 | Rhoads et al. | |
| 5,726,805 A * | 3/1998 | Kaushik | G01J 3/02 359/489.19 |
| 6,078,389 A | 6/2000 | Zetter | |
| 6,154,550 A | 11/2000 | Beyer | |
| 6,163,259 A | 12/2000 | Barsumian et al. | |
| 6,176,323 B1 * | 1/2001 | Weirich | E21B 21/08 175/40 |
| 6,198,531 B1 | 3/2001 | Myrick et al. | |
| 6,213,250 B1 | 4/2001 | Wisniewski et al. | |
| 6,218,978 B1 | 4/2001 | Simpkin et al. | |
| 6,519,037 B2 * | 2/2003 | Jung | G01J 3/02 250/226 |
| 6,529,276 B1 | 3/2003 | Myrick | |
| 6,646,753 B2 | 11/2003 | Zhang et al. | |
| 6,774,517 B2 | 6/2004 | Forno et al. | |
| 6,804,060 B1 | 10/2004 | Tsai et al. | |
| 6,897,952 B1 * | 5/2005 | Hagler | G01J 3/02 356/310 |
| 6,905,578 B1 | 6/2005 | Moslehi et al. | |
| 6,965,431 B2 | 11/2005 | Vo-Dinh et al. | |
| 7,123,844 B2 | 10/2006 | Myrick | |
| 7,138,156 B1 | 11/2006 | Myrick et al. | |
| 7,163,901 B2 | 1/2007 | Downey | |
| 7,332,044 B2 | 2/2008 | Sidorin et al. | |
| 7,332,094 B2 | 2/2008 | Abney et al. | |
| 7,472,748 B2 | 1/2009 | Gdanski et al. | |
| 7,623,233 B2 | 11/2009 | Freese et al. | |
| 7,679,563 B2 | 3/2010 | Werner et al. | |
| 7,697,141 B2 | 4/2010 | Jones et al. | |
| 7,712,527 B2 | 5/2010 | Roddy | |
| 7,753,847 B2 | 7/2010 | Greenleaf et al. | |
| 7,777,870 B2 | 8/2010 | Hayes et al. | |
| 7,792,644 B2 | 9/2010 | Kotter et al. | |
| 7,828,929 B2 | 11/2010 | Lee et al. | |
| 7,834,999 B2 | 11/2010 | Myrick et al. | |
| 7,895,903 B2 * | 3/2011 | Bailey | G01F 1/666 702/100 |
| 7,911,605 B2 | 3/2011 | Myrick et al. | |
| 7,920,258 B2 | 4/2011 | Myrick et al. | |
| 7,934,556 B2 | 5/2011 | Clark et al. | |
| 8,054,212 B1 | 11/2011 | Holly et al. | |
| 8,094,311 B2 * | 1/2012 | Uzunbajakava | G01J 3/02 250/339.12 |
| 8,106,850 B1 | 1/2012 | Gregoire et al. | |
| 8,141,633 B2 | 3/2012 | Hampton et al. | |
| 8,164,061 B2 | 4/2012 | Pawlak et al. | |
| 8,213,006 B2 * | 7/2012 | Myrick | G01J 3/02 356/300 |
| 8,216,161 B2 | 7/2012 | Darlington et al. | |
| 8,252,112 B2 | 8/2012 | Ovshinsky | |
| 8,575,541 B1 * | 11/2013 | Jamison | E21B 21/00 250/253 |
| 8,879,053 B2 * | 11/2014 | Freese | G01K 13/00 356/73 |
| 8,885,163 B2 * | 11/2014 | Morys | G01N 21/31 250/339.11 |
| 8,902,423 B2 * | 12/2014 | Myrick | G01J 3/4406 356/319 |
| 8,908,165 B2 * | 12/2014 | Tunheim | G01N 21/85 356/73 |
| 9,182,282 B2 * | 11/2015 | Myrick | G01J 3/02 |
| 9,261,461 B2 * | 2/2016 | Tunheim | G01N 21/85 |
| 9,371,577 B2 * | 6/2016 | Perkins | G02B 5/28 |
| 9,383,307 B2 * | 7/2016 | Freese | G01N 21/27 |
| 9,523,786 B2 * | 12/2016 | Perkins | G01N 1/00 |
| 9,702,811 B2 * | 7/2017 | Freese | G01N 21/17 |
| 9,708,908 B2 * | 7/2017 | Gao | G01J 3/00 |
| 9,727,052 B2 * | 8/2017 | Price | G01J 3/28 |
| 2002/0131044 A1 * | 9/2002 | Kobayashi | G01J 3/02 356/419 |
| 2004/0233508 A1 | 11/2004 | Kosc | |
| 2005/0054928 A1 | 3/2005 | Cerofolini | |
| 2006/0142955 A1 * | 6/2006 | Jones | E21B 47/102 702/32 |
| 2007/0282647 A1 | 12/2007 | Freese et al. | |
| 2008/0231849 A1 | 9/2008 | Myrick et al. | |
| 2008/0238801 A1 | 10/2008 | Ragan | |
| 2008/0276687 A1 | 11/2008 | Myrick et al. | |
| 2009/0073433 A1 | 3/2009 | Myrick et al. | |
| 2009/0097024 A1 | 4/2009 | Blackburn et al. | |
| 2009/0140144 A1 | 6/2009 | Myrick et al. | |
| 2009/0154288 A1 | 6/2009 | Heathman | |
| 2009/0182693 A1 | 7/2009 | Fulton et al. | |
| 2009/0213380 A1 * | 8/2009 | Appel | G01N 21/274 356/437 |
| 2009/0216504 A1 | 8/2009 | Priore et al. | |
| 2009/0219512 A1 | 9/2009 | Myrick et al. | |
| 2009/0219538 A1 | 9/2009 | Myrick et al. | |
| 2009/0219539 A1 | 9/2009 | Myrick et al. | |
| 2009/0250613 A1 | 10/2009 | Myrick et al. | |
| 2009/0299946 A1 | 12/2009 | Myrick et al. | |
| 2009/0316150 A1 | 12/2009 | Myrick et al. | |
| 2010/0042348 A1 * | 2/2010 | Bakker | G01J 3/28 702/85 |
| 2010/0050905 A1 | 3/2010 | Lewis et al. | |
| 2010/0051266 A1 | 3/2010 | Roddy et al. | |
| 2010/0051275 A1 | 3/2010 | Lewis et al. | |
| 2010/0073666 A1 | 3/2010 | Perkins et al. | |
| 2010/0141952 A1 | 6/2010 | Myrick et al. | |
| 2010/0149537 A1 | 6/2010 | Myrick et al. | |
| 2010/0153048 A1 | 7/2010 | Myrick et al. | |
| 2010/0182600 A1 | 7/2010 | Freese et al. | |
| 2010/0182712 A1 * | 7/2010 | Chinnock | G01J 1/24 359/890 |
| 2010/0195105 A1 | 8/2010 | Myrick et al. | |
| 2010/0238801 A1 | 9/2010 | Smith et al. | |
| 2010/0245096 A1 | 9/2010 | Jones et al. | |
| 2010/0265509 A1 | 10/2010 | Jones et al. | |
| 2010/0271285 A1 | 10/2010 | Yun et al. | |
| 2010/0302539 A1 | 12/2010 | Myrick et al. | |
| 2010/0305741 A1 | 12/2010 | Myrick | |

(56) References Cited

U.S. PATENT DOCUMENTS

| | | | |
|---|---|---|---|
| 2010/0328669 A1 | 12/2010 | Myrick et al. | |
| 2011/0048708 A1 | 3/2011 | Glasbergen et al. | |
| 2011/0093205 A1 | 4/2011 | Bern | |
| 2011/0163046 A1 | 7/2011 | Neal et al. | |
| 2011/0164124 A1* | 7/2011 | Hizume | G01N 21/6456 348/61 |
| 2011/0199610 A1 | 8/2011 | Myrick et al. | |
| 2012/0084021 A1* | 4/2012 | Jones | E21B 47/10 702/45 |
| 2012/0150451 A1* | 6/2012 | Skinner | G01N 33/2823 702/24 |
| 2012/0182438 A1* | 7/2012 | Berkner | G01J 3/2823 348/222.1 |
| 2012/0194713 A1* | 8/2012 | Hunt | B82Y 20/00 348/294 |
| 2012/0211650 A1* | 8/2012 | Jones | E21B 47/102 250/269.1 |
| 2012/0268744 A1 | 10/2012 | Wolf et al. | |
| 2012/0300064 A1* | 11/2012 | Mann | G01C 11/025 348/135 |
| 2013/0284894 A1 | 10/2013 | Freese et al. | |
| 2013/0284895 A1 | 10/2013 | Freese et al. | |
| 2013/0284896 A1 | 10/2013 | Freese et al. | |
| 2013/0284897 A1 | 10/2013 | Freese et al. | |
| 2013/0284898 A1 | 10/2013 | Freese et al. | |
| 2013/0284899 A1 | 10/2013 | Freese et al. | |
| 2013/0284900 A1 | 10/2013 | Freese et al. | |
| 2013/0284901 A1 | 10/2013 | Freese et al. | |
| 2013/0284904 A1* | 10/2013 | Freese | G01N 21/17 250/214 DC |
| 2013/0286398 A1 | 10/2013 | Freese et al. | |
| 2013/0286399 A1 | 10/2013 | Freese et al. | |
| 2013/0287061 A1 | 10/2013 | Freese et al. | |
| 2014/0076551 A1* | 3/2014 | Pelletier | G01N 21/47 166/253.1 |
| 2015/0028226 A1* | 1/2015 | Watanabe | G01N 21/6486 250/459.1 |
| 2015/0131101 A1* | 5/2015 | Kasahara | G01J 3/36 356/451 |
| 2015/0293401 A1* | 10/2015 | Yi | G02F 1/133514 359/891 |

FOREIGN PATENT DOCUMENTS

| | | |
|---|---|---|
| EP | 2140238 | 1/2010 |
| KR | 10-2011-0075539 | 7/2011 |
| KR | 2013/0017718 | 2/2013 |
| WO | WO 2004/015364 | 2/2004 |
| WO | WO 2005/093904 | 10/2005 |
| WO | WO 2006/031733 | 3/2006 |
| WO | WO 2006/137902 | 12/2006 |
| WO | WO 2007/064575 | 6/2007 |
| WO | WO 2007/015115 | 8/2007 |
| WO | WO2011/103066 | 8/2011 |
| WO | WO2013/022556 | 2/2013 |
| WO | WO2014/042642 | 3/2014 |

OTHER PUBLICATIONS

Authorized officer Cha, Young Lan, International Search Report and Written Opinion for PCT/US2013/049693, dated Mar. 20, 2014, 12 pages.

Commissioner, International Search Report and Written Opinion for PCT/US2014/042368, dated Mar. 13, 2015, 15 pages.

Gdanski et al., "Using Lines-of-Solutions to Understand Fracture Conductivity and Fracture Cleanup," SPE 142096, SPE Production and Operations Symposium held in Oklahoma City, OK, Mar. 27-29, 2011, 16 pages.

Telemark, "Model 820 In-Situ Spectroscopic Optical Monitor," Dec. 2010, 4 pages.

J.A. Woollam Co., Inc., Characterizing Processes with EASE® In Situ Applications, Application Note, 2009, 3 pages.

Gdanski et al., "A New Model for Matching Fracturing Fluid Flowback Composition," SPE Hydraulic Fracturing Technology Conference held in College Station, Texas, SPE 106040, Jan. 29-31, 2007, 9 pages.

Bossard et al., "The Design and fabrication of planar multiband metallodielectric frequency selective surfaces for infrared applications", IEEE Trans. On Antennas and Propagation, v. 50, No. 4, Apr. 2006, 12 pages.

Frey et al., "Temperature-dependent refractive index of silicon and germanium," NASA Goodard Space Flight Center, Greenbelt, MD, 2006, 10 pages.

Zoeller et al., "Substantial progress in optical monitoring by intermittent measurement technique," SPIE, Published in the processing of the OSD, Jena 2005, vol. 5963-13, 9 pages.

Haibach et al., "Precision in multivariate optical computing," Applied Optics, vol. 43, No. 10, Apr. 1, 2004, 11 pages.

Rabady et al., "High-resolution photometric optical monitoring for thin-film deposition," Applied Optics, Optical Society of America, vol. 43, No. 1, Jan. 1, 2004, 6 pages.

Priore et al., "Novel Imaging Systems: Multivariate Optical Computing in the UV-VIS," Department of Chemistry and Biochemistry, University of South Carolina, 2003, 5 pages.

Myrick et al., "A single-element all-optical approach to chemometric prediction," Vibrational Spectroscopy 28, 2002, 9 pages.

Myrick, "Multivariate optical elements simplify spectroscopy," Laser Focus World, Mar. 1, 2002, access date Feb. 28, 2013, 3 pages http://www.laserfocusworld.com/articles/print/volume-38/issue-3/features/spectroscopy/multivariate-optical-elements-simplify-spectroscopy.html.

Myrick et al., "Application of multivariate optical computing to simple near-infrared point measurements," SPIE vol. 4574, Department of Chemistry and biochemistry, University of South Carolina, 2002, 8 pages.

Morton et al., "Optical Monitoring of Thin-films Using Spectroscopic Ellipsometry," Society of Vacuum Coaters, 45th Annual Technical Conference Proceedings, 2002, 7 pages.

Paul et al., "Fabrication of mid-infrared frequency-selective surfaces by soft lithography", Applied Optics, v. 40, No. 25, Sep. 2001, 5 pages.

Myrick et al., "Spectral Tolerance Determination for Multivariate Optical Element Design," Fresenuis' Journal of Analytical Chemistry, 369, 2001, 5 pages.

Eastwood et al., "Filed applications of stand-off sensing using visible/NIR multivariate optical computing," Department of Chemistry and Biochemistry, University of South Carolina, SPE vol. 4199, 2001, 10 pages.

Soyemi et al., "Novel Filter Design Algorithm for Multivariate Optical Computing," Advanced Environmental and Chemical Sensing Technology, SPIE vol. 4205, 2001, 12 pages.

Munk, "Frequency Selective Surfaces: Theory and Design", John Wiley and Sons, Inc., New York, 2000, 92 pages.

Woollam et al., "Overview of Variable Angle Spectroscopic Ellipsometer (VASE), Part 1: Basic Theory and Typical Applications," Society of Photo-Optical Instrumentation Engineers, Critical Reviews of Optical Science Technology CR72, 1999, 28 pages.

Wu, "Frequency Selective Surface and Grid Army", Trw Electronic Systems and Technology Division, John Wiley & Sons, Inc., New York, 1995, 10 pages.

Nelson et al., "Multivariate Optical Computation for Predictive Spectroscopy", Analytical Chemistry 1998, 70, Jo pages.

Grader et al., "Fourier transform infrared spectroscopy of a single aerosol particle," J. Chem. Phys. 86 (11), Jun. 1, 1987, 7 pages.

Li, "Refractive Index of Silicon and Germanium and Its Wavelength and Temperature Derivatives," Center for Information and Numerical Data Analysis and Synthesis, Purdue University, J. Phys. Chem. Ref. Data, vol. 9, No. 3, 1980, 98 pages.

* cited by examiner

INTEGRATED COMPUTATIONAL ELEMENTS WITH LATERALLY-DISTRIBUTED SPECTRAL FILTERS

BACKGROUND

The subject matter of this disclosure is generally related to optical analysis systems for analyzing a substance of interest, for example, crude petroleum, gas, water, or other wellbore fluids. For instance, the disclosed optical analysis systems use an integrated computational element (ICE) that has a set of laterally-distributed spectral filters.

Information about a substance can be derived through the interaction of light from the ultraviolet (UV) to infrared (IR) ranges with that substance. The interaction changes characteristics of the light, specifically the frequency (correspondingly, wavelength), intensity, polarization, and/or direction (e.g., through scattering, absorption or refraction). Chemical or physical properties of the substance can be determined based on the changes in the characteristics of the light interacting with the substance. For example, in certain applications, one or more properties of crude petroleum, gas, water, or other wellbore fluids can be derived in-situ in petroleum fields, more commonly referred to as oil fields, as a result of the interaction between these substances and light. For example, downhole instruments can use the interaction between light and substances found downhole for making fluid (oil, gas and water) and geological chemical and physical measurements at well sites.

Integrated computational elements (ICEs) are filters that transform light into chemical or physical information through the use of regression techniques. ICE filters (or simply ICEs) represent pattern recognition systems which recognize certain spectral patterns using vector regression techniques. Typically, an ICE is a substrate with multiple stacked dielectric layers (e.g., about 30 to 50 layers), each having a different refractive index from its adjacent layers. The ICE is configured to selectively pass predetermined fractions of light of different wavelengths. For instance, the number of layers N, the materials and the spacings of the N layers that compose the ICE are selected, e.g., using conventional methods for designing so called optical interference filters, so each wavelength of the light transmitted through the ICE can be weighted in a predetermined manner.

Because ICEs are configured to extract information from light modified by a sample without having to perform spectral analysis outside of the ICEs, they can be incorporated in low cost and rugged instruments. Hence, such ICE-based downhole instruments can provide a relatively low cost, rugged and accurate system for monitoring petroleum quality.

DESCRIPTION OF DRAWINGS

Like reference symbols in the various drawings indicate like elements.

DETAILED DESCRIPTION

Figure 1:
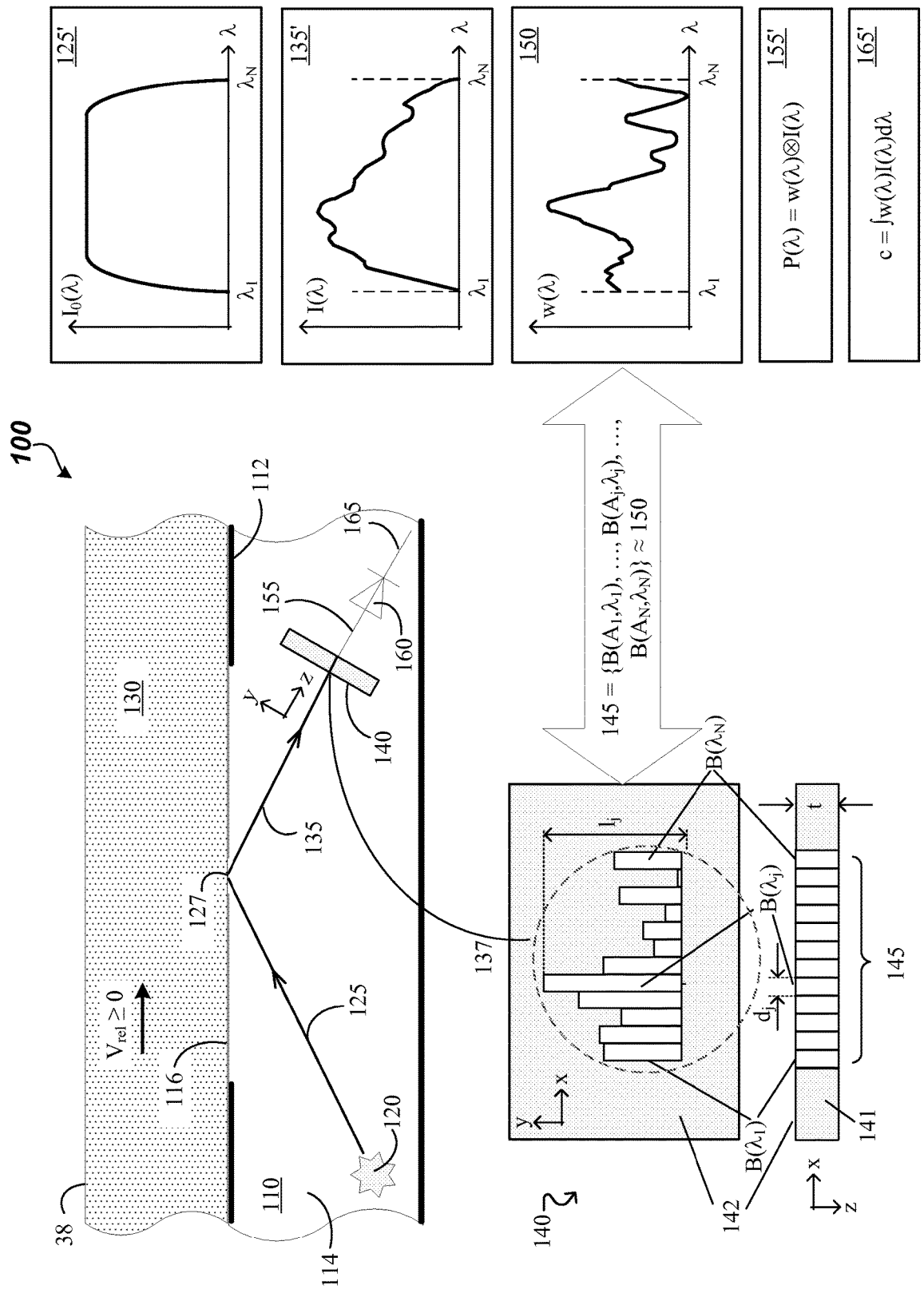
FIG. 1 shows an example of a system for measuring a property of a sample using an ICE that has a set of laterally-distributed spectral filters.

Embodiments of optical analysis systems using an ICE that has a set of laterally-distributed spectral filters are disclosed. The spectral filters can be distributed over a surface of a substrate, such that relative areas of the spectral filters are configured to selectively pass or block (e.g., reflect or absorb) predetermined fractions (e.g., corresponding to the relative lateral area of each filter) of light of different wavelengths. The substrate can be formed from a material that is non-transparent to the different wavelengths for a transmissive configuration of the ICE, or from a material that is non-reflective to the different wavelengths for a reflective configuration of the ICE. In general, the systems can be used in a variety of applications. For example, the systems can be used for measuring one or more properties (e.g., physical and/or chemical properties) of various samples (e.g., crude petroleum, gas, water, or other wellbore fluids).

In general, one aspect of the subject matter described in this specification can be implemented in a system that includes a light source that, during operation of the system, illuminates a sample with light having a source spectrum over a wavelength range to obtain light modified by the sample. The light modified by the sample has a modified spectrum over the wavelength range, and the modified spectrum corresponds to the sample. The system further includes an integrated computational element (ICE) including a set of spectral filters spectrally imprinted over a substrate surface. The set of spectral filters is spectrally equivalent to a filter spectrum over the wavelength range, and the filter spectrum corresponds to a set of spectra of the sample respectively taken for known values of a property of the sample. Each spectral filter in the set is centered on an associated wavelength and has an associated area, such that the associated area is proportional to a value of the filter spectrum at the associated wavelength. The ICE (i) is arranged to receive the light modified by the sample and (ii) outputs processed light that has a processed spectrum over the wavelength range. Additionally, the system includes a photodetector optically coupled with the ICE to receive the processed light. The photodetector integrates the processed spectrum over the wavelength range to determine a current value of the property of the sample.

The foregoing and other implementations can each optionally include one or more of the following features, alone or in combination. In some implementations, when the substrate surface is non-transparent over the wavelength range, the spectral filters are band-pass spectral filters. In other implementations, when the substrate surface is transparent over the wavelength range, the spectral filters are band-stop spectral filters. Moreover, when the light modified by the sample is received at the ICE, a spot size encompasses a lateral spatial extent of the set of spectral filters. For example, the spectral filters of the set can be distributed over the substrate surface of the ICE, such that a difference between the spot size and an area defined by the lateral spatial extent of the set is minimized As another example, an area defined by the lateral spatial extent of the set can be optimized within the encompassing spot size to increase a flux corresponding to the processed spectrum that reaches the photodetector.

In some implementations, the spectral filters of the set can be distributed over the substrate surface of the ICE in increasing or decreasing order of their respective wavelengths. In some implementations, the spectral filters of the set can have rectangular shapes with a same width and respective lengths proportional to values of the filter spectrum at corresponding wavelengths, and are distributed over the substrate surface of the ICE such that (i) a longest spectral filter of the set is in the center of the distribution, and (ii) remaining spectral filters of the set are distributed laterally outward from the center in decreasing order of their respective lengths. In some implementations, the spectral filters of the set can be shaped as sectors of a circle over the substrate surface, and each of the sectors subtends an angle proportional to a value of the filter spectrum at an associated wavelength. In some implementations, the spectral filters of the set can be shaped as annular segments with a same width and respective lengths proportional to values of the filter spectrum at corresponding wavelengths, and are distributed concentrically over the substrate surface. In some implementations, the spectral filters of the set can have annular shapes with different widths, and are distributed concentrically over the substrate surface.

In some implementations, the spectral filters of the set can extend from the substrate surface of the ICE through the entire thickness of the ICE. In some implementations, the ICE can include materials that are photosensitive over the wavelength range.

In some implementations, the set of spectral filters can be spectrally imprinted over a predetermined portion of the substrate surface. In this case, the ICE includes one or more additional sets of spectral filters spectrally imprinted over the substrate surface. Further, each of the additional sets of spectral filters is spectrally equivalent to an associated filter spectrum over the wavelength range, such that the associated filter spectrum corresponds to an associated set of spectra of the sample respectively taken for known values of an additional property. Each spectral filter in the additional set is centered on an associated wavelength and has an associated area, such that the associated area is proportional to a value of the filter spectrum at the associated wavelength. Furthermore, each of the additional sets of spectral filters is spectrally imprinted over an associated other predetermined portion of the substrate surface, such that other predetermined portions of the substrate surface corresponding to the respective additional sets of spectral filters are laterally separated, from each other and from the predetermined portion corresponding to the set of spectral filters, by separations at least a size of a spot size when the light modified by the sample is received at the ICE.

In general, another aspect of the subject matter described in this specification can be implemented in a measurement tool that contains an optical element including a substrate and a plurality of spectral filters supported by the substrate and arranged at different lateral positions with respect to a path of light to be received from a sample during operation of the measurement tool. Each spectral filter is formed to transmit or reflect a different subset of wavelengths in a wavelength range. Additionally, each spectral filter has a respective area exposed to the light from the sample, such that the respective areas are related to a property of the sample.

The foregoing and other implementations can each optionally include one or more of the following features, alone or in combination. In some implementations, the wavelength range can include wavelengths in a range from about 0.2 µm to about 25 µm. In some implementations, the sample can include wellbore fluids and the property of the sample is a property of the wellbore fluids. For example, the property of the sample can be one or more of a concentration of a substance in the sample, a pH of the sample, a ratio of concentrations of two different substances in the sample, a density of the sample, or a viscosity of the sample.

In some implementations, the area of each spectral filter can have a quadrilateral or arcuate shape. In some implementations, the spectral filters can include band-pass filters. In other implementations, the spectral filters can include band-stop filters.

In some implementations, the measurement tool can include a light source positioned to illuminate the sample with light having a first spectrum over the wavelength range. Moreover, the optical element is positioned to receive the light from the sample in response to the illumination, such that the light received from the sample has a second spectrum over the wavelength range. The second spectrum corresponds to the first spectrum modified by the sample. Further, the measurement tool can include a detector positioned to receive light from the optical element and produce a signal having a value related to an integrated intensity of the light from the optical element across the wavelength range. The signal value corresponds to a value of the property of the sample. Furthermore, the spectral filters are provided within an illuminated area of the optical element. As such, the measurement tool can include one or more additional optical elements configured to shape the light at the optical element to span the illuminated area.

In some implementations, the measurement tool can include a transparent element positioned in a path of the light between the light source and the sample. Here, the optical element is positioned to receive light reflected from an interface between the sample and the transparent element.

In another aspect, a method can include placing the foregoing measurement tool in a wellbore, and determining the value of a property of a sample in the wellbore using the placed measurement tool.

One or more of the following advantages can be realized. Processes used to fabricate the disclosed ICEs that have laterally-distributed spectral filters may be less complex than the processes used to fabricate conventional ICEs. The processes used to fabricate conventional ICEs typically include thin film deposition techniques such as sputtering, chemical vapor deposition, atomic layer deposition for depositing multiple layers (e.g., 30-50 or more) included in conventional thin film based ICEs. During such deposition processes, as the actual thickness deposited for each layer may deviate from the original design due to possible variations in the environment as well as in control, it is necessary to continuously monitor the film growth, and run a complex optimization algorithm in real time to ensure that each of the finished films is as close to the original design as possible. Once the conventional thin film based ICEs are deposited successfully, they are subject to a thermal annealing process in order to ensure that they can properly function at elevated temperatures.

The disclosed ICEs with laterally-distributed spectral filters may be fabricated by using printing techniques, for instance, by exposing different regions of a surface of photosensitive substrates to different wavelengths of light. Such printing techniques may enable (i) large-scale production of inexpensive and reliable ICEs with laterally-distributed spectral filters; (ii) reduction/elimination of high cost vacuum deposition chambers and controls; (iii) elimination of the real-time optimization procedure currently required when depositing conventional thin film based ICEs. As such, significant cost reduction and increase in quality/reliability can be achieved when fabricating ICEs with laterally-distributed spectral filters because they are simpler to fabricate compared to the conventional thin film based ICEs.

Further, the disclosed ICEs with laterally-distributed spectral filters can be calibrated at design-level (e.g., once over several/all batches) in contrast with the conventional ICEs which generally require batch-level calibration (e.g., batch-to-batch calibration). Before conventional ICEs can be used in a measurement tool, they are calibrated with known fluid standards, at different temperatures and pressures. The calibration process minimizes adverse effects caused by unavoidable differences induced, even in ICEs of identical design, by the above-noted complex fabrication process. The printing techniques used to fabricate the ICEs with laterally-distributed spectral filters enable reduction in the amount of time and effort required for calibration, since sets of laterally-distributed spectral filters can be printed to have better uniformity and fewer variations from batch to batch compared to uniformities and variations specific to processes used to fabricate the multilayered structures of the conventional ICEs.

Furthermore, the disclosed ICEs can be designed for operation in the mid to far-IR spectral ranges, while the conventional ICEs are mostly used in the near-IR spectral range. Conventional ICEs include multiple interlaced layers of two materials with different indices of refraction. Combinations of the number of layers, thickness thereof, and properties of the conventionally used materials enable design of conventional ICEs with a filter spectrum that extends into the near-IR spectral range. In contrast, a filter spectrum of ICEs with laterally-distributed spectral filters can extend to mid-IR or far-IR because a set of spectral filters equivalent to such a mid/far-IR filter spectrum can be printed on a substrate.

At least for the above reasons, measurement tools that use ICEs with laterally-distributed spectral filters have lower cost in manufacture, calibration and maintenance compared to measurement tools that use conventional thin film based ICEs.

Details of one or more of the foregoing embodiments are described below.

FIG. 1 shows aspects of an example of a system 100 for measuring one or more properties of a sample using an ICE that has a set of laterally-distributed spectral filters. The system 100 includes a measurement tool 110 optically coupled to a sample 130. In this example, the sample 130 can be crude petroleum, gas, water, or other wellbore fluids contained in a pipe 38 that can be part of a pipeline or a downhole pipe in a well. The downhole pipe may be a vertical pipe or horizontal pipe and may be part of a well head, a pipeline, or a well completion. Pipe 38 may be internal to a sampler, or other downhole sensing tool. In some implementations, a window 116 separates the measurement tool 110 from the sample 130, such that sensors inside the measurement tool 110 measure attributes of fluids surrounding the measurement tool 110. In some implementations, the pipe 38 can be a flow line in a wireline or logging while drilling formation pump out tester where formation fluid is drawn into the measurement tool 110 and analyzed in order to characterize a reservoir. In some cases, the sample 130 can be relatively at rest with respect to the measurement tool 110 ($V_{rel}$=0) during the measurement, for example when both the measurement tool 110 and the fluid in the pipe 38 move at the same velocity or are both stationary. In some other cases, the measurement tool 110 can move relative to the sample 130 ($|V_{rel}|$>0) during the measurement, for example when the measurement tool 110 is pushed/pulled through stationary fluid in the pipe 38, or when the fluid flows through the pipe 38 with a flow velocity different from the velocity of the measurement tool 110.

In this example, the measurement tool 110 includes a light source 120, an ICE 140 with laterally-distributed spectral filters, and a photodetector 160. The measurement tool 110 has a frame 112 such that these components are arranged in an enclosure 114 thereof. A cross-section of the measurement tool 110 in a plane perpendicular to the page can vary, depending on the space available. For example, the measurement tools' cross-section can be circular or rectangular, for instance. The measurement tool 110 directs light to the sample 130 through an optical interface 116, e.g., an aperture/window in the frame 112. The measurement tool 110 is configured to probe the sample 130 (e.g., the wellbore fluids flowing) in the pipe 38 through the optical interface 116 and to determine an amount (e.g., a value) of a given property (also referred to as a property to be measured) of the probed sample 130. The property to be measured can be any one of multiple properties of the sample 130 including concentration of a given substance in the sample, a gas-oil-ratio (GOR), pH value, density, viscosity, etc.

The light source 120 outputs light having a source spectrum $I_0(\lambda)$ 125' over a particular wavelength range, from a first wavelength $\lambda_1$ to a second wavelength $\lambda_N$. In some implementations, the source spectrum 125' can have non-zero intensity over the entire or most of the wavelength range $\lambda_N$-$\lambda_1$. In some implementations, the source spectrum 125' extends through UV-vis (0.2-0.8 µm) and near-IR (0.8-2.5 µm) spectral ranges. Alternatively, or additionally, the source spectrum 125' extends through near-IR and mid-IR (2.5-25 µm) spectral ranges. In some other implementations, the source spectrum 125' extends through near-IR, mid-IR and far-IR (25-100 µm) spectral ranges. In some implementations, the light source 120 is tunable and is configured in combination with time resolved signal detection and processing.

The example of source spectrum 125' illustrated in FIG. 1 is depicted as being substantially flat over most of the noted wavelength range, however, in general, the intensity at different wavelengths across the spectral band of interest may vary.

The light source 120 is arranged to direct a probe beam 125 of the source light towards the optical interface 116 where it illuminates the sample 130 at a location 127. The source light in the probe beam 125 interacts with the sample 130 and reflects off it as light modified by the sample 130. The light modified by the sample has a modified spectrum $I(\lambda)$ 135' over the particular wavelength range. In the reflective configuration of the measurement tool 110 illustrated in FIG. 1 (i.e., where the light to be analyzed reflects at the sample/window interface), the modified spectrum $I(\lambda)$ 135' is a reflection spectrum associated with the sample 130. In a transmission configuration of the measurement tool 110 (not shown in FIG. 1), the probe beam is transmitted through the sample as modified light, such that the modified spectrum is a transmission spectrum associated with the sample. Examples of modified spectra I(λ) 135' are described below in connection with FIG. 6. In general, the modified spectrum I(λ) 135' encodes information about multiple properties associated with the sample 130, and more specifically the encoded information relates to current values of the multiple properties.

With continued reference to FIG. 1, and the Cartesian coordinate system provided therein for reference, the ICE 140 is arranged to receive a beam 135 of the modified light, and is configured to process it and to output a beam 155 of processed light. The beam 135 of modified light is incident on a first surface 142 of the ICE 140 along the z-axis, and the beam 155 of processed light is output along the z-axis after transmission through the ICE 140. Alternatively or additionally, the beam 155 (or an additional reflected beam) of processed light can be output after reflection off the first surface 142 of the ICE 140. The ICE 140 is configured to process the modified light by filtering it in accordance with a filter spectrum w(λ) 150 associated with a property to be measured.

The filter spectrum w(λ) 150 is determined offline by applying conventional processes to a set of modified spectra I(λ) of the sample which correspond to respective known values of the property to be measured. For instance, a filter spectrum w(λ) can be determined through regression analysis of N modified spectra $I_j(\lambda)$ of a sample, where j=1–N, such that each of the modified spectra $I_j(\lambda)$ corresponds to an associated known value of a given property for the sample. The regression analysis detects, within the N modified spectra $I_j(\lambda)$, the filter spectrum w(λ) that is unique to identifying and quantifying the given property. In this manner, when a value of the given property for the sample is unknown, a modified spectrum $I_u(\lambda)$ of the sample can be acquired and then parsed with the ICE 140 to determine a magnitude of the filter spectrum w(λ) within the modified spectrum $I_u(\lambda)$. The determined magnitude represents the unknown value of the given property for the sample.

For example, the sample 130 can be a compound containing substances X, Y and Z, and the property to be measured for the sample 130 is concentration $c_X$ of substance X in the compound. In this case, N modified spectra $I_j(\lambda)$ were acquired for N samples of the compound having respectively known concentration values for each of the substances contained in the N samples. By applying regression analysis to the N modified spectra $I_j(\lambda)$, a filter spectrum $w_{cX}(\lambda)$ that is unique for the concentration $c_X$ of the X substance can be detected (recognized). Similarly, filter spectrums $w_{cY}(\lambda)$ and $w_{cZ}(\lambda)$ that are respectively unique for concentrations $c_Y$ and $c_Z$ of the Y and Z substances can also be detected. In this manner, when a new sample 130 of the compound has an unknown concentration $c_X$ of the X substance, for instance, a modified spectrum $I_n(\lambda)$ of the new sample 130 can be acquired and then parsed to determine a magnitude of the filter spectrum $w_{cX}(\lambda)$ within the modified spectrum. The determined magnitude represents the unknown value of the concentration $c_X$ of the X substance for the new sample 130.

In the example illustrated in FIG. 1, the ICE 140 includes a substrate 141 having a first surface 142, and a set 145 of spectral filters that are laterally-distributed over the first surface 142. In this case, the spectral filters of the set 145 extend along the z-axis from the first surface 142 through the entire thickness of the ICE 140. Areas of the spectral filters in the set 145 are configured such that the set 145 of laterally-distributed spectral filters are spectrally equivalent to the filter spectrum w(λ) 150 associated with the property to be measured, as described in detail below. In this manner, the beam 155 of processed light output by the ICE 140 has a processed spectrum P(λ)=w(λ)⊗I(λ) 155' over the wavelength range $\lambda_N$-$\lambda_1$, such that the processed spectrum 155' represents the modified spectrum I(λ) 135' weighted by the filter spectrum w(λ) 150 associated with the property to be measured.

The beam 155 of processed light is directed from the ICE 140 to the photodetector 160, which detects the processed light and outputs a detector signal 165. A value (e.g., a voltage) of the detector signal 165 is a result of an integration of the processed spectrum 155' over the particular wavelength range and corresponds to the unknown value "c" 165' of the property to be measured for the sample 130. If the ICE 140 (or a second ICE—not shown in FIG. 1) contained a second set of laterally-distributed spectral filters that is spectrally equivalent to a second filter spectrum $w_2(\lambda)$ associated with a second property of the sample 130, a second processed spectrum would represent the modified spectrum I(λ) 135' weighted by the second filter spectrum $w_2(\lambda)$, such that a second value of a second detector signal corresponds to a value of the second property for the sample 130. In some implementations, the determined value 165' of the property to be measured can be logged along with a measurement time, geo-location, and other metadata, for instance. In some implementations, the detector signal 165, which corresponds to a property to be measured by the measurement tool 110, can be used as a feedback signal to adjust the property of the sample, to modify the sample or environmental conditions associated with the sample, as desired.

Various implementations of an ICE 140 with laterally-distributed spectral filters are now described. In the example illustrated in FIG. 1, the substrate 141 can be fabricated from a material that is sensitive to light over the particular wavelength range $\lambda_N$-$\lambda_1$ in at least two dimensions, e.g., in the (x,y) plane. Light sensitivity of the substrate material causes, when portions of the substrate 141 are exposed to appropriate light, a permanent change in the transmission or reflectance of the exposed substrate portions. A positive response of the substrate material results in an ICE 140 having a set of laterally-distributed band-pass spectral filters that is spectrally equivalent to the filter spectrum w(λ) 150. The undeveloped material (on portions of the substrate 141 outside of the set 145 of laterally-distributed band-pass spectral filters) is non-transparent to all wavelengths over the particular wavelength range. In this case, the band-pass spectral filters of the set 145 extend along the z-axis from the first surface 142 through the entire thickness of the ICE 140, as shown in FIG. 1. Alternatively, a negative response of the substrate material results in an ICE having a set of laterally-distributed band-stop spectral filters that is spectrally equivalent to a negative filter spectrum w(λ) 150. The undeveloped material (on portions of the substrate 141 outside of the set 145 of laterally-distributed band-stop spectral filters) is transparent to all wavelengths over the particular wavelength range. In this case, the band-stop spectral filters of the set 145 can be placed on the first surface 142 or can extend along the z-axis from the first surface 142 through at least a portion of the entire thickness of the ICE 140 (not shown in FIG. 1.)

The substrate 141 of the ICE 140 with laterally-distributed spectral filters can be a conventional photographic film (e.g., commercially available slide film) when the measurement tool 110 is used in the visible spectral range 350-700 nm. The substrate 141 of the ICE 140 with laterally-distributed spectral filters is made from an IR-sensitive film when the measurement tool 110 is used in the IR spectral range. Such films can have a thickness "t" in the range of 2-200 µm. In some implementations, the laterally-distributed spectral filters can be formed, in a photosensitive, selectively-absorptive or reflective material or materials deposited on a transparent substrate, as band-stop spectral filters. In other implementations, the laterally-distributed spectral filters can be formed, in another photosensitive, selectively-transmissive material or materials deposited on a non-transparent substrate, as band-pass spectral filters.

Spectral filters in the set 145 can have various lateral dimensions and/or shapes (e.g., aspect ratios.) As illustrated in FIGS. 2A-2F and 4, the spectral filters can be shaped as rectangles (of length "l" and width "d"), annuluses (like a doughnut), annulus segments (like portions of a doughnut), circle sectors (like a slice of pie), and the like. A lower bound for the lateral dimensions of the spectral filters can be in the range of 2-20 µm, depending on the resolution of (i) a printing system used to generate the spectral filters, and/or (ii) the film 141.

In the example illustrated in FIG. 1, the first surface 142 is oriented along the x-y plane of the Cartesian coordinate system local to the ICE 140. The set 145 of laterally-distributed spectral filters is spectrally equivalent to the filter spectrum $w(\lambda)$ 150 associated with the property to be measured, because the set 145 includes N band-pass spectral filters $B(A_j; \lambda_j, \Delta\lambda_j)$, where $j=1-N$, such that each of the band-pass spectral filters (i) is centered on an associated wavelength $\lambda_j$, (ii) has an effective spectral width $\Delta\lambda_j$, and (iii) has an associated area $A_j$ proportional to a value $w(\lambda_j)$ of the filter spectrum $w(\lambda)$ 150 at the associated wavelength $\lambda_j$. Note that, although the spectral filters of the set 145 are described, in connection with FIGS. 1 and 2A-2F, to be band-pass spectral filters imprinted on a non-transparent substrate 141, the spectral filters of the set 145 can be band-stop filters imprinted on a transparent substrate. The band-pass (or band-stop) spectral filters of the set 145 can be Gaussian filters or top hat filters, for instance. Respective effective spectral widths of the band-pass (or band-stop) spectral filters of the set 145 can be different or can be the same.

The area $A_j$ of a rectangular-shaped band-pass spectral filter is $A_j=l_j*d_j$. Areas of band-pass spectral filters that are shaped as an annulus or as a circle sector can be computed using appropriate formulas. A ratio between (i) a first area $A_i$ of a first band-pass spectral filter $B(A_i; \lambda_i, \Delta\lambda_i)$ with a first effective spectral width $\Delta\lambda_i$ and centered on a first wavelength $\lambda_i$ and (ii) a second area $A_j$ of a second band-pass spectral filter $B(A_j; \lambda_j, \Delta\lambda_j)$ with a second effective spectral width $\Delta\lambda_j$ and centered on a second wavelength $\lambda_j$ is given by Equation (1):

$$\frac{A_i}{A_j} = \frac{w(\lambda_i)\Delta\lambda_i}{w(\lambda_j)\Delta\lambda_j}. \qquad (1)$$

Here $w(\lambda_i)$ and $w(\lambda_j)$ are the values of the filter spectrum $w(\lambda)$ 150 at the first and second wavelengths $\lambda_i$ and $\lambda_j$. When the first and second band-pass spectral filters have equal effective spectral widths, the ratio between (i) the first area $A_i$ of the first band-pass spectral filter $B(A_i; \lambda_i)$ centered on the first wavelength $\lambda_i$ and (ii) the second area $A_j$ of the second band-pass spectral filter $B(A_j; \lambda_j)$ centered on the second wavelength $\lambda_j$ is given by Equation (2):

$$\frac{A_i}{A_j} = \frac{w(\lambda_i)}{w(\lambda_j)}\bigg|_{when \Delta\lambda_i = \Delta\lambda_j}. \qquad (2)$$

An area $A_j$ of the band-pass spectral filter $B(A_j; \lambda_j)$ centered on the wavelength $\lambda_j$, which corresponds to the maximum value of the filter spectrum $w(\lambda_j)=w_{max}$, is the maximum area of the N band-pass spectral filters of the set 145, and has a value $A_j=A_{max}$. In accordance with Equation (2), areas of the remaining (N−1) band-pass spectral filters of the set 145 are $A_1=[w(\lambda_1)/w_{max}]*A_{max}$ for the $1^{st}$ band-pass spectral filter $B(A_1; \lambda_1)$ centered on the first wavelength $\lambda_1$; $A_2=[w(\lambda_2)/w_{max}]*A_{max}$ for the $2^{nd}$ band-pass spectral filter $B(A_2; \lambda_2)$ centered on the second wavelength $\lambda_2$; . . . $A_N=[w(\lambda_N)/w_{max}]*A_{max}$ for the $N^{th}$ band-pass spectral filter $B(A_N; \lambda_N)$ centered on the $N_{th}$ wavelength $\lambda_N$.

The maximum area $A_{max}$ of the band-pass spectral filter $B(\lambda_j)$ centered on the wavelength $\lambda_j$, which corresponds to the maximum value of the filter spectrum $w(\lambda_j)=w_{max}$, is selected such that a total area of the N band-pass spectral filters of the set 145 is less than or equal to a beam size 137 of the modified beam 135 when it reaches the first surface 142 of the ICE 140. In this manner, all N band-pass spectral filters of the set 145 can filter the beam 135 of modified light to properly weigh the modified spectrum 135' by the filter spectrum $w(\lambda)$ 150 associated with the ICE 140. The ICE 140 would not function properly if fewer than all of the N band-pass spectral filters of the set 145 filtered the beam 135 of modified light, because a set containing fewer than all of the N band-pass spectral filters is not spectrally equivalent to the filter spectrum $w(\lambda)$ 150.

However, regions of the first surface 142 of the substrate that are not part of the set 145 of laterally-distributed spectral filters, but are encompassed by the spot size 137, do not contribute to processing of the beam 135 of modified light, in fact they do not even allow transmission of the modified light. As such, presence of non-processing regions of the substrate surface within the spot size 137 contributes to degradation of a value of signal-to-noise ratio for the processed spectrum 155'. Accordingly, the N band-pass spectral filters of the set 145 should be appropriately sized and laterally-distributed over the surface 142 of the substrate 141 in various arrangements, as described in detail below, such that a difference between the spot size 137 and the total area of the N band-pass spectral filters of the set 145 is minimized. Such optimization can result in an increase of a flux corresponding to the processed spectrum 155' that reaches the photodetector 160.

For a given spot size 137, self-consistent parameters that are used to carry out the foregoing optimization can be (i) the arrangement used to laterally distribute the N band-pass spectral filters of the set 145, and (ii) the maximum area $A_{max}$ of the band-pass spectral filter $B(\lambda_j)$ centered on the wavelength $\lambda_j$, which corresponds to the maximum value of the filter spectrum $w(\lambda_j)=w_{max}$.

In the example illustrated in FIG. 1, the N band-pass spectral filters of the set 145 are rectangular shaped and have uniform widths. Accordingly, a length $l_i$ of a band-pass spectral filter $B(\lambda_i)$ centered on the wavelength $\lambda_i$ satisfies $$l_i = \frac{w(\lambda_i)}{w(\lambda_j)} l_{max}, \qquad (3)$$

where $w(\lambda_i)$ is the value of the filter spectrum $w(\lambda)$ 150 at the center wavelength $\lambda_i$ of the band-pass spectral filter $B(\lambda_i)$, and $l_{max}$ is a length of the band-pass spectral filter $B(\lambda_j)$ centered on the wavelength $\lambda_j$, which corresponds to the maximum value of the filter spectrum $w(\lambda_j)=w_{max}$. In this case, the N band-pass spectral filters of the set 145 are laterally-distributed in order of increasing wavelength, B($\lambda_1$), B($\lambda_2$), . . . , B($\lambda_N$) along the x-axis, and have one of their ends aligned to a line y=constant. This arrangement of the N band-pass spectral filters of the set 145 corresponds to an "image" of the filter spectrum 150 to which it is spectrally equivalent.

In general, compactness of a lateral distribution "C" can be quantified as a ratio of (i) a total area of the N band-pass spectral filters of the set 145 to (ii) the spot size 137 that inscribes the N band-pass spectral filters of the set 145. Note that C≤1. In this case, lengths of two of the $1^{st}$ band-pass spectral filter B($\lambda_1$), the last $N^{th}$ band-pass spectral filter B($\lambda_N$), and the $j^{th}$ band-pass spectral filter B($\lambda$j) which has the maximum length, constrain the lateral distribution of the N band-pass spectral filters of the set 145 along the x-axis, and thus, limit the compactness of the lateral distribution $C_1$<1 shown in FIG. 1.

Figure 2A:
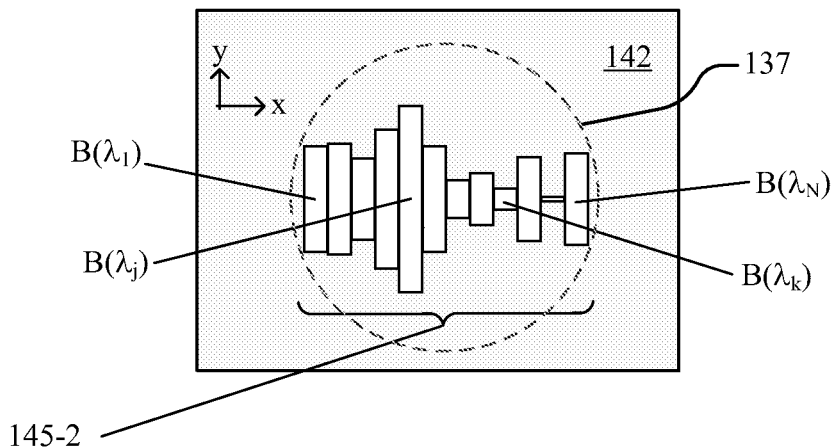
FIGS. 2A-2F show examples of lateral distributions over a surface of an ICE for a set of spectral filters.

FIG. 2A shows a view of the first surface 142 of the ICE 140 with a set 145-2 of N band-pass spectral filters that are laterally-distributed based on another arrangement. The set 145-2 of N band-pass spectral filters is spectrally equivalent to the filter spectrum 150 as described above in connection with FIG. 1. The N band-pass spectral filters of the set 145-2 are rectangular shaped, have uniform widths and have lengths that satisfy Equation 3. In this case, the N band-pass spectral filters of the set 145-2 are laterally-distributed in order of increasing wavelength, B($\lambda_1$), B($\lambda_2$), . . . , B($\lambda_N$) along the x-axis, and have their centers aligned to a diameter of the spot size 137. In this case, lengths of the $1^{st}$ band-pass spectral filter B($\lambda_1$) and the last, $N^{th}$ band-pass spectral filter B($\lambda_N$) constrain the lateral distribution of the N band-pass spectral filters of the set 145 along the x-axis. In this manner, the set 145-2 can potentially have a larger compactness of the lateral distribution than the set 145 shown in FIG. 1, $C_1$<$C_2$<1.

Figure 2B:
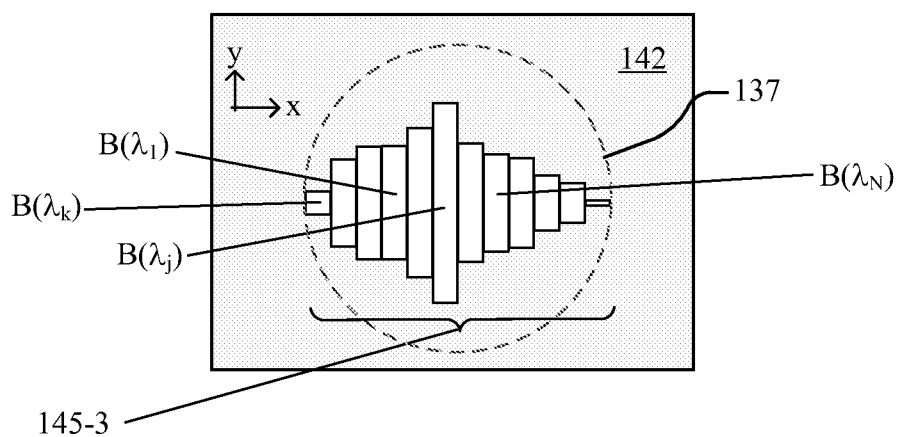

FIG. 2B shows a view of the first surface 142 of the ICE 140 with a set 145-3 of N band-pass spectral filters that are laterally-distributed based on another arrangement. The set 145-3 of N band-pass spectral filters is spectrally equivalent to the filter spectrum 150 as described above in connection with FIG. 1. The N band-pass spectral filters of the set 145-3 are rectangular shaped, have uniform widths and have lengths that satisfy Equation 3. In this case, the N band-pass spectral filters of the set 145-3 are laterally-distributed such that a longest band-pass spectral filter B($\lambda_j$) is in the center of the distribution, and remaining band-pass spectral filters of the set 145-3 are distributed laterally outward from the center, along the x-axis, in decreasing order of their respective lengths, and have their centers aligned to a diameter of the spot size 137. In this case, lengths of the shortest band-pass spectral filter and the next shortest band-pass spectral filter B($\lambda_k$) constrain the lateral distribution of the N band-pass spectral filters of the set 145 along the x-axis. In this manner, the set 145-3 can potentially have a larger compactness of the lateral distribution than the set 145-2 shown in FIG. 2A, $C_2$<$C_3$<1.

Figure 2C:
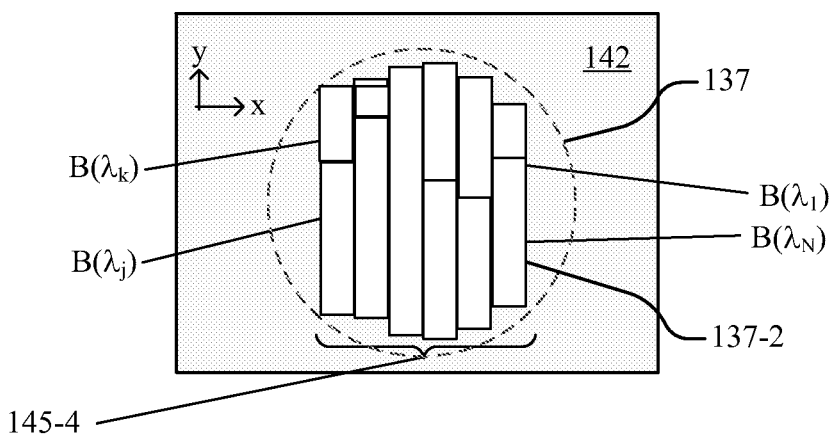

FIG. 2C shows a view of the first surface 142 of the ICE 140 with a set 145-4 of N band-pass spectral filters that are laterally-distributed based on another arrangement. The set 145-4 of N band-pass spectral filters is spectrally equivalent to the filter spectrum 150 as described above in connection with FIG. 1. The N band-pass spectral filters of the set 145-4 are rectangular shaped, have uniform widths and have lengths that satisfy Equation 3. In this case, the N band-pass spectral filters of the set 145-4 are laterally-distributed to form a most compact distribution of N rectangles with uniform widths. The N rectangles are tiled to form an aggregate patch for which a difference between the spot size 137 and the patch area is minimum. In this manner, the set 145-4 has a larger compactness of the lateral distribution than the set 145-3 shown in FIG. 2B, $C_3$<$C_4$<1.

Figure 2D:
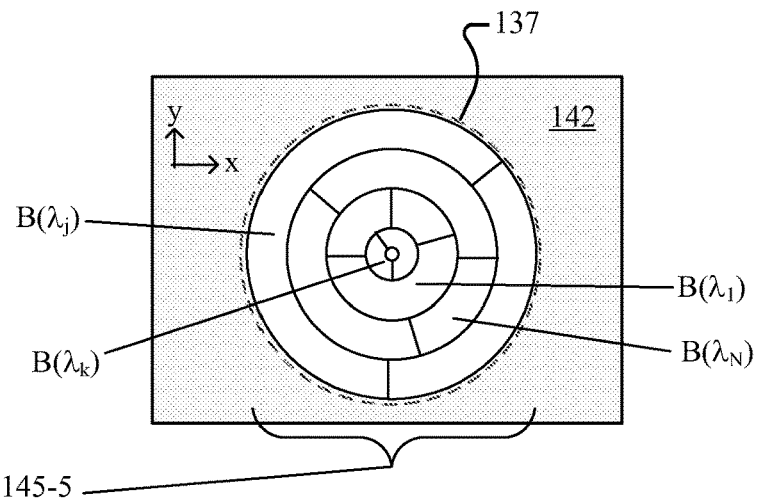

FIG. 2D shows a view of the first surface 142 of the ICE 140 with a set 145-5 of N band-pass spectral filters that are laterally-distributed based on another arrangement. The set 145-5 of N band-pass spectral filters is spectrally equivalent to the filter spectrum 150 as described above in connection with FIG. 1. The N band-pass spectral filters of the set 145-5 are shaped as annular segments of different radiuses and have uniform widths. (Imagine bending the rectangles with uniform widths of the previously described sets 145, 145-2, 145-3, and 145-4.) An area $A_i$ of a band-pass spectral filter B($\lambda_i$) centered on the wavelength satisfies $$A_i = \frac{w(\lambda_i)}{w(\lambda_j)} A_{max}, \quad (2')$$

where w($\lambda_i$) is the value of the filter spectrum w($\lambda$) 150 at the center wavelength of the band-pass spectral filter B($\lambda_i$), and $A_{max}$ is an area of the band-pass spectral filter B($\lambda_j$) centered on the wavelength $\lambda_j$, which corresponds to the maximum value of the filter spectrum w($\lambda_j$)=$w_{max}$. In this case, the N band-pass spectral filters of the set 145-5 that are shaped as annular segments can be tiled to fully fill the spot size 137, and hence, to form a most compact distribution $C_5$≈1. In this manner, the set 145-5 has a larger compactness of the lateral distribution than the set 145-4 shown in FIG. 2C, $C_4$<$C_5$≈1.

Figure 2E:
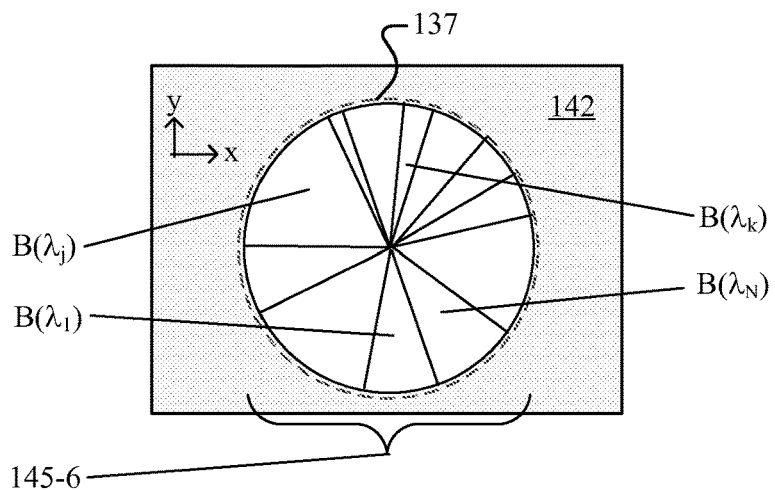

FIG. 2E shows a view of the first surface 142 of the ICE 140 with a set 145-6 of N band-pass spectral filters that are laterally-distributed based on another arrangement. The set 145-6 of N band-pass spectral filters is spectrally equivalent to the filter spectrum 150 as described above in connection with FIG. 1. The N band-pass spectral filters of the set 145-6 are shaped as segments of a circle that subtend corresponding angles. An angle $\theta_i$ of a circular sector-shaped band-pass spectral filter B($\lambda_i$) centered on the wavelength $\lambda_i$ satisfies $$\theta_i = \frac{w(\lambda_i)}{w(\lambda_j)} \theta_{max}, \quad (4)$$

where w($\lambda_i$) is the value of the filter spectrum w($\lambda$) 150 at the center wavelength $\lambda_i$ of the band-pass spectral filter B($\lambda_i$), and $\theta_{max}$ is an angle of a circular sector-shaped band-pass spectral filter B($\lambda_j$) centered on the wavelength $\lambda_j$, which corresponds to the maximum value of the filter spectrum w($\lambda_j$)=$w_{max}$. When a radius of the N band-pass spectral filters of the set 145-6 is equal to a radius of the spot size 137, the N circular sector-shaped band-pass spectral filters can be tiled to fully fill the spot size 137, and hence, to form a most compact distribution $C_6$≈1. In this manner, the set 145-6 has a compactness of the lateral distribution about equal to the set 145-5 shown in FIG. 2D, $C_5$≈$C_6$≈1.

Figure 2F:
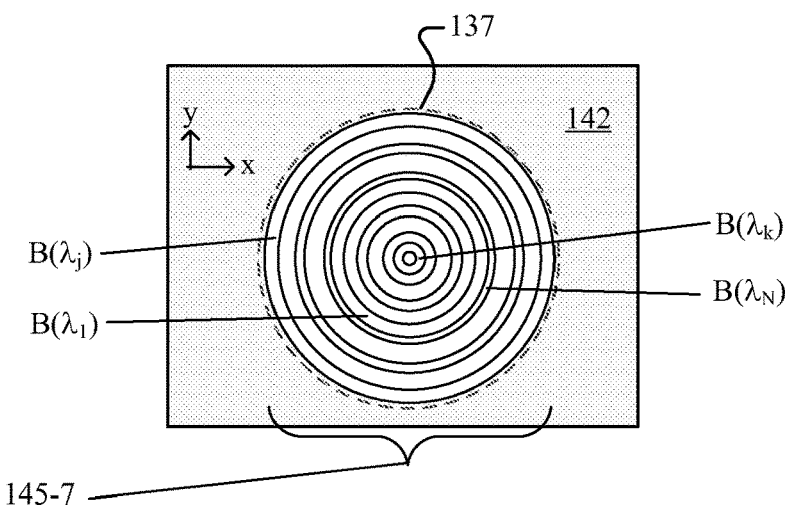

FIG. 2F shows a view of the first surface 142 of the ICE 140 with a set 145-7 of N band-pass spectral filters that are laterally-distributed based on another arrangement. The set 145-7 of N band-pass spectral filters is spectrally equivalent to the filter spectrum 150 as described above in connection with FIG. 1. The N band-pass spectral filters of the set 145-7 are shaped as annuluses of different radiuses and widths. The N annulus-shaped band-pass spectral filters of the set 145-7 have areas that satisfy Equation 2'. In this case, the N annulus-shaped band-pass spectral filters of the set 145-7 can be tiled to fully fill the spot size 137, and hence, to form a most compact distribution $C_7 \approx 1$. In this manner, the set 145-7 has a compactness of the lateral distribution about equal to each of the sets 145-5 and 145-6 shown in FIGS. 2D-2E, $C_5 \approx C_6 \approx C_7 \approx 1$.

Figure 3B:
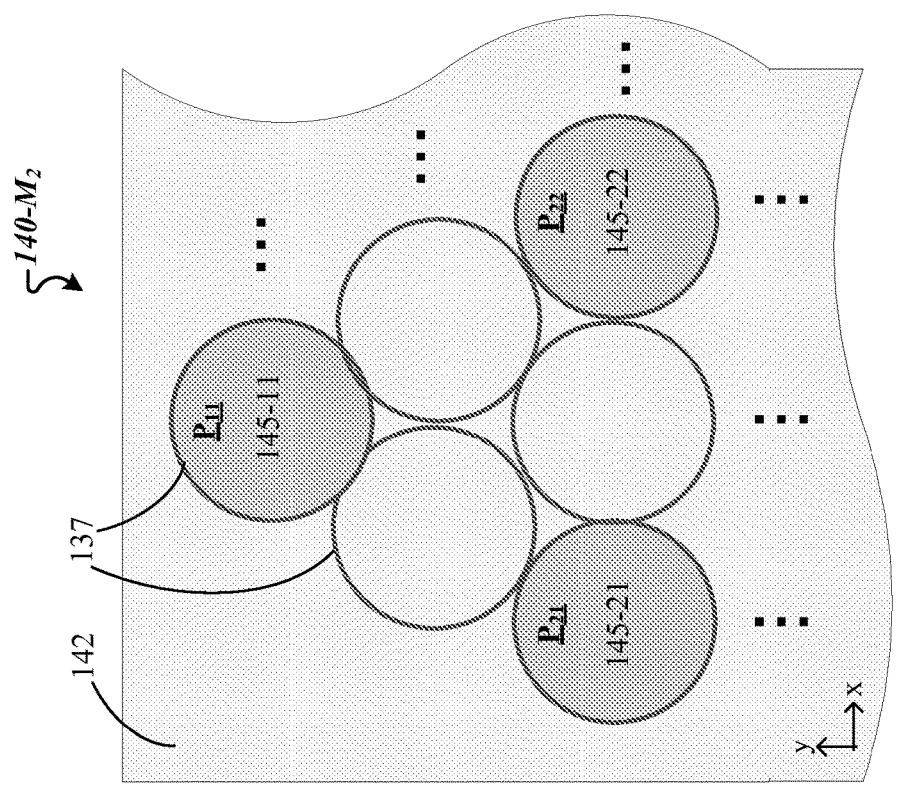
FIG. 3B shows another example of an arrangement of different sets of laterally-distributed spectral filters over a surface of an ICE.
Figure 3A:
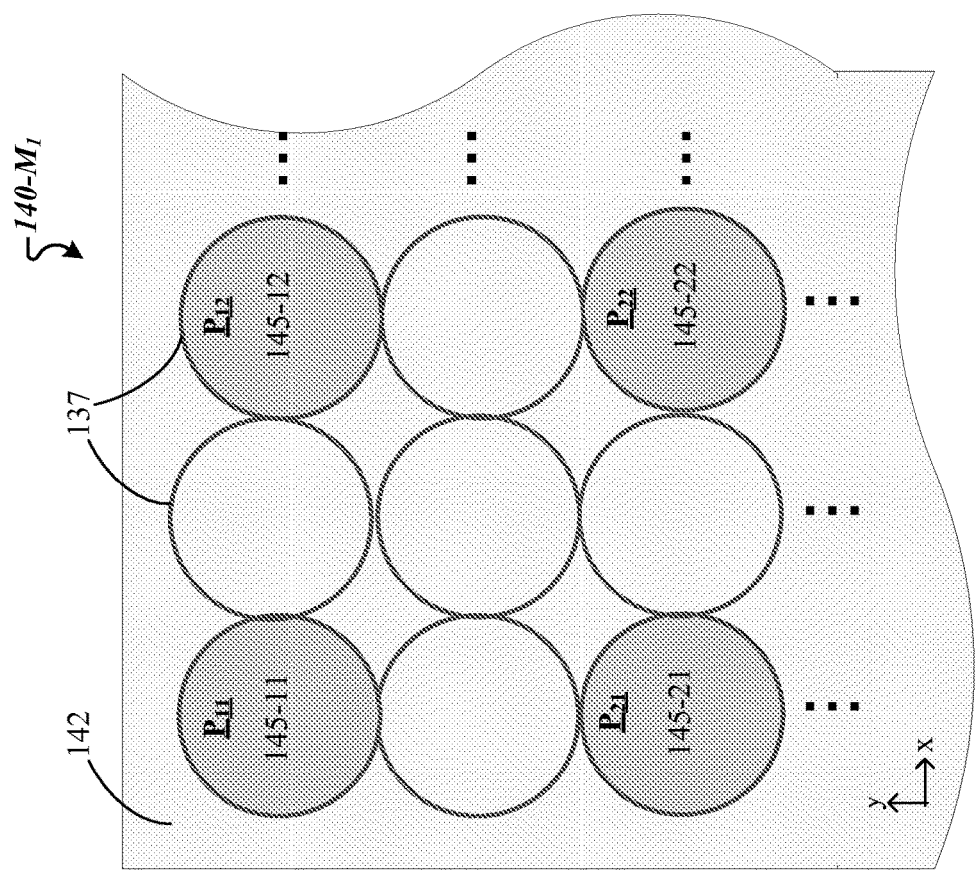
FIG. 3A shows an example of an arrangement of different sets of laterally-distributed spectral filters over a surface of an ICE.

FIGS. 3A-3B show examples of different arrangements $M_1$, $M_2$ of different sets 145-$ij$ of laterally-distributed spectral filters of two ICEs 140-$M_1$, 140-$M_2$. Portions $P_{ij}$ of the first surface 142 of an ICE 140-$M_1$ (or 140-$M_2$) can be identified based on their location within an arrangement $M_1$ (or $M_2$) of rows. Index "i" is a row label and index "j" is a count within a row. Different rows can have the same or different number of portions $P_{ij}$, and the rows can, but need not, be offset with respect to each other.

In general, a portion $P_{ij}$ of the first surface 142 of an ICE 140-$M_1$ (or 140-$M_2$) is configured to have a set 145-$ij$ of laterally-distributed spectral filters. A filter spectrum 155-$ij$, to which the set 145-$ij$ of laterally-distributed spectral filters is spectrally equivalent, is associated with a property (i,j) of the sample 130. In this manner, the measurement tool 110 that includes the ICE 140-$M_1$ (or 140-$M_2$) can sequentially output values of properties (i,j), as the beam 135 of modified light is laterally scanned over stationary portions $P_{ij}$, or as the portions $P_{ij}$ are laterally translated to cross a stationary beam 135 of modified light.

For example, the portion $P_{11}$ can have the set 145-11 of laterally-distributed spectral filters illustrated in FIGS. 1 and 2A-2F ("145-11"≡145); a filter spectrum w(λ) 150, to which the set 145 of laterally-distributed spectral filters is spectrally equivalent, is associated with a property (1,1) of the sample 130; the property (1,1) can be the concentration of butane in crude petroleum, for instance. As another example, the portion $P_{12}$ can have a second set 145-12 of laterally-distributed spectral filters; a filter spectrum $w_2(\lambda)$, to which the second set 145-12 of laterally-distributed spectral filters is spectrally equivalent, is associated with a property (1,2) of the sample 130; the property (1,2) can be the concentration of methane in crude petroleum, for instance. As yet another example, the portion $P_{21}$ can have a third set 145-21 of laterally-distributed spectral filters; a filter spectrum $w_3(\lambda)$, to which the third set 145-21 of laterally-distributed spectral filters is spectrally equivalent, is associated with a property (2,1) of the sample 130; the property (2,1) can be the pH of crude petroleum, for instance. As another example, the portion $P_{22}$ can have a fourth set 145-22 of laterally-distributed spectral filters; a filter spectrum $w_4(\lambda)$, to which the fourth set 145-22 of laterally-distributed spectral filters is spectrally equivalent, is associated with a property (2,2) of the sample 130; the property (2,2) can be the viscosity of crude petroleum, for instance. Other sets of laterally-distributed spectral filters, which correspond to other properties of the sample 130, can be configured for the foregoing portions or other portions $P_{ij}$.

As described above in connection with FIG. 1, a lateral size of a portion $P_{ij}$, which encompasses a set 145-$ij$ of laterally-distributed spectral filters, is configured to be about equal to a spot size 137 of the beam 135 of modified light when it reaches the first surface 142 of the ICE. The spot size 137 can be in the range of 0.1-2 mm, for instance. Additionally, the portions $P_{ij}$ are distributed over the first surface 142 of the ICE 140-$M_1$ (or 140-$M_2$) such that they are separated from each other by separations that are about equal to the spot size 137. In this manner, the measurement tool 110 can sequentially output values of properties (i,j) as portions $P_{ij}$ of the ICE 140-$M_1$ (or 140-$M_2$) process the beam 135 of modified light independently from adjacent portions $P_{ij}$, $P_{(i\pm1),(j\pm1)}$. Separations between adjacent portions $P_{ij}$, $P_{(i\pm1),(j=1)}$ that are smaller than the spot size 137 would expose the beam 135 of modified light simultaneously to two different sets 145-$ij$, 145-(i±1,j±1) of laterally-distributed spectral filters. In such case, different equivalent filter spectrums 155-$ij$, 155-(i±1,j±1) of the ICE would simultaneously contribute to the processed spectrum 155'. Such simultaneous contributions to the processed spectrum 155' would be integrated together by the photodetector 160 to generate a value of an arbitrary combination of a property (i,j) with a property (i±1,j±1) of the sample 130. Conversely, separations between adjacent portions $P_{ij}$, $P_{(i\pm1),(j\pm1)}$ that are substantially larger than the spot size 137 would unjustifiably increase unused areas of the first surface 142 of the ICE 140-$M_1$ (or 140-$M_2$).

There are a variety of ways to arrange the portions $P_{ij}$ which have sizes comparable to the spot size 137 and are separated from each other by spacings comparable to the spot size 137. FIG. 3A shows a first surface 142 of an ICE 140-$M_1$ onto which portions $P_{ij}$ are distributed based on a square arrangement aligned with the x and y-axes, for instance. In this example, nearest-neighbors of a portion $P_{ij}$ are located along the x and y-axes. Compactness of an arrangement can be quantified as a ratio of (i) a number of portions $P_{ij}$ to (ii) a number of regions that separate the portions $P_{ij}$ from their nearest-neighbor portions $P_{(i+1),(j+1)}$. In this manner, a compactness of the square arrangement corresponding to the ICE 140-$M_1$ has a value of 4/5=0.8. FIG. 3B shows a first surface 142 of an ICE 140-$M_2$ onto which portions $P_{ij}$ are distributed based on a triangular arrangement, where a base of the triangle is aligned with the x-axis, for instance. In this example, nearest-neighbors of a portion $P_{ij}$ are located along the x-axis and along rays oriented at ±60° and ±120°. A compactness of the triangular arrangement corresponding to the ICE 140-$M_2$ has a value of 3/3=1, which is larger than the value of the compactness of the square arrangement of the ICE 140-$M_1$.

In general, ICEs with laterally-distributed spectral filters can be manufactured in a variety of different ways.

Figure 4:
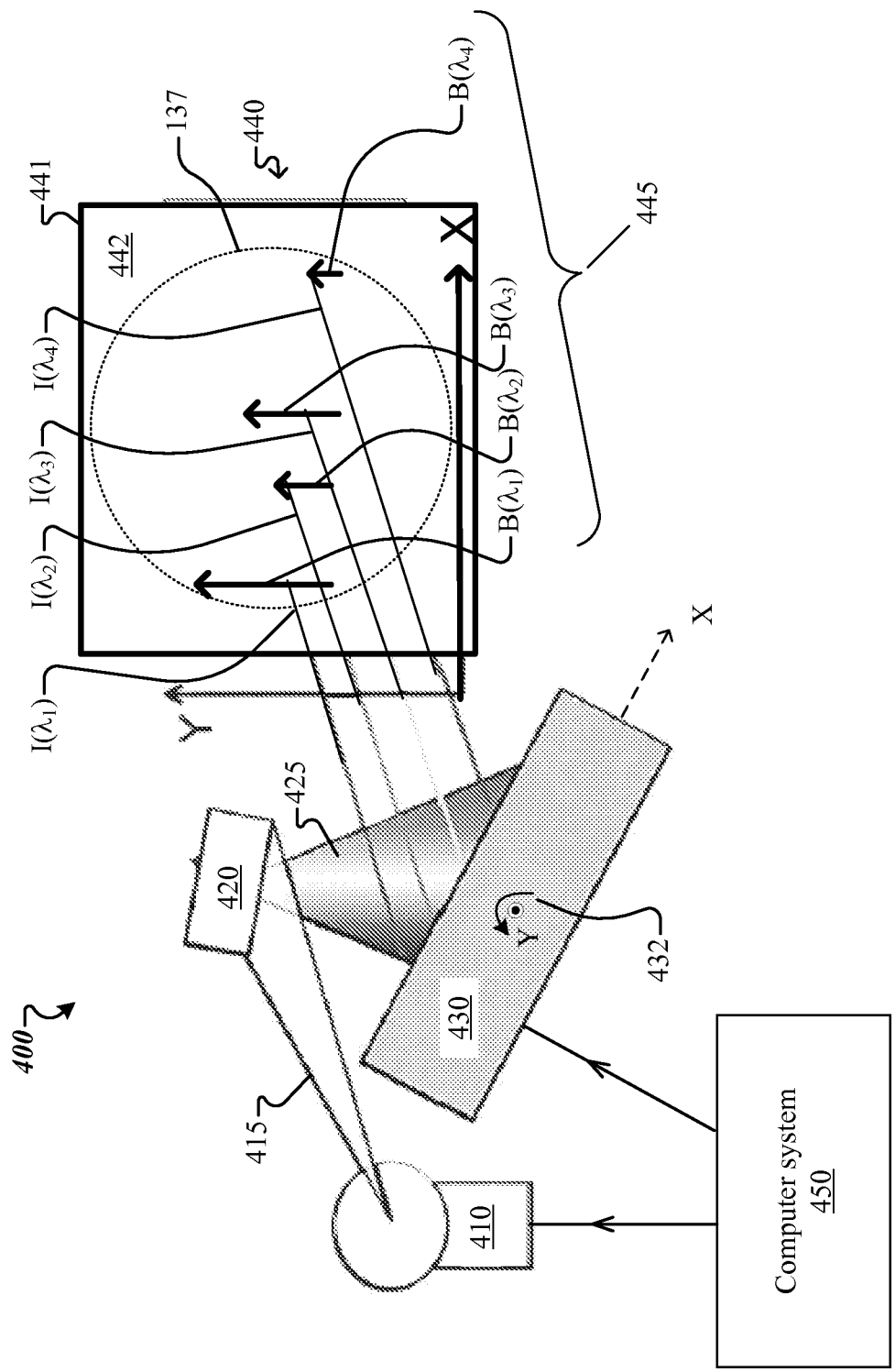
FIG. 4 show a system for fabricating an ICE that has a set of laterally-distributed spectral filters.

FIG. 4 show a system 400 for fabricating an ICE 440 that has a linear array 445 of band-pass filters. In some implementations, the system 400 can be used to fabricate the ICEs 140, 140-$M_1$ and/or 140-$M_2$ described above in connection with FIGS. 1, 2A-2F and 3A-3B.

In this example, the system 400 includes a light source 410, a dispersing element 420, beam steering element 430, and a computer system 450. A target filter spectrum $w_t(\lambda)$ is obtained by the computer system 450 (e.g., from user input or by accessing a database). The computer system 450 can control the light source 410 and the beam steering element 430 to print in a substrate 441 a linear array 445 of band-pass filters that is spectrally equivalent to the target filter spectrum $w_t(\lambda)$. As described above in connection with FIG. 1, the substrate 441 is capable of optically capturing wavelength dependent features.

The light source 410 outputs source light 415 in a particular wavelength range $\lambda_4$-$\lambda_1$. The particular wavelength range spans at least a spectral range of the target filter spectrum $w_t(\lambda)$. A spectrum of the source light 415 can be the source spectrum 120' illustrated in FIG. 1, for instance. In some implementations, the dispersive element 420 is a grating. In some implementations, the dispersive element 420 is a prism. The dispersive element 420 is arranged and configured to disperse the broad source spectrum as dispersed light 425 in the plane of the page (around a y-axis normal to the page.)

In some implementations, the beam steering element 430 is a 2-D array of controllable mirrors, e.g., a Digital Light Processing (DLP) device. In the example illustrated in FIG. 4, the controllable mirrors are distributed in a plane (x,y) perpendicular to the page. The dispersed light 425 is redirected from the dispersive element 420 to the beam steering element 430. In this manner, redirected light with short wavelengths reaches the beam steering element 430 at small values along the x-axis, and the redirected light with long wavelengths reaches the beam steering element 430 at large values along the x-axis. The controllable mirrors of the 2-D DLP device 430 are controlled by the computer system 450 to spatially divert specific bands of light $\lambda_1$, $\lambda_2$, $\lambda_3$ and $\lambda_4$ at tunable intensities $I(\lambda_1)$, $I(\lambda_2)$, $I(\lambda_3)$ and $I(\lambda_4)$ towards a surface 442 of the substrate 441. For example, the 2-D DLP device 430 can activate columns of mirrors along the x-axis, from a short wavelength side of the device to a long wavelength side thereof, to divert to the substrate 141 light of a specific wavelength associated with one (or more adjacent) column(s) of mirrors. Note that control of columns along the x-axis specifies respective central wavelengths $\lambda_j$ of band-pass filters $B(\lambda_j)$ printed in the substrate 441, where j=1, 2, 3, 4. A geometric width $d_j$ (along with an equivalent spectral width $\Delta\lambda_j$) of the printed band-pass filter $B(\lambda_j)$ is specified by a number of columns adjacent to the one that specifies the central wavelength $\lambda_j$. For example, a geometrically narrow (or equivalently a narrow spectral width of the) printed band-pass filter $B(\lambda_j)$ is specified by appropriately activating 1 (to 3 adjacent) column(s). As another example, a geometrically wide (or equivalently a broad spectral width of the) printed band-pass filter $B(\lambda_j)$ is specified by appropriately activating several adjacent columns, e.g., 5-10.

Moreover, an intensity $I(\lambda_j)$ transmitted by a printed band-pass filter $B(\lambda_j)$ is controlled by a number of mirrors activated within a column, which specifies a central wavelength $\lambda_j$ of the band-pass filter $B(\lambda_j)$. A geometric length $l_j$ (corresponding to an equivalent value of the target filter spectrum $w_t(\lambda_j)$) of the printed band-pass filter $B(\lambda_j)$ is specified by a number of mirrors activated in one (or more adjacent) column(s) which specifies(y) a central wavelength $\lambda_j$ of the band-pass filter $B(\lambda_j)$. For example, a geometrically short (corresponding to an equivalent small value of the target filter spectrum $w_t(\lambda_j)$) printed band-pass filter $B(\lambda_j)$ is specified by activating a few mirrors, e.g., 2-10, in an appropriate one (or more adjacent) column(s). As another example, a geometrically long (corresponding to an equivalent large value of the target filter spectrum $w_t(\lambda_j)$) printed band-pass filter $B(\lambda_j)$ is specified by activating many mirrors, e.g., 20-100, in an appropriate one (or more adjacent) column(s).

In this manner, the system 400 can be used to activate specific portions of the substrate 441. For example, the activated portions have specified lengths (along the y-axis) and widths (along the x-axis) as described above. As such, the printed substrate 441 becomes analogous to a linear array 445 of band-pass filters $B(\lambda_1)$, $B(\lambda_2)$, $B(\lambda_3)$, $B(\lambda_4)$ (like a nonlinear-comb filter). The non-activated regions of the substrate 441 are opaque to all wavelengths of light in the particular wavelength range $\lambda_4$-$\lambda_1$. The linear array 445 of band-pass filters only transmit light through rectangles with lengths (y-axis) determined by the number of mirrors activated by the DLP device 430 and widths determined by wavelengths of light (along the x-axis) corresponding to columns activated by the DLP device 430. Intensity $I(\lambda_1)$, $I(\lambda_2)$, $I(\lambda_3)$ and $I(\lambda_4)$ (determined by the # of mirrors activated by the DLP device 430) as a function of position (determined by wavelength) on the substrate is recorded photographically in the substrate 441. Moreover, the linear array 445 of band-pass filters (i) is printed in the substrate 441 to be equivalent to the target filter spectrum $w_t(\lambda)$, and (ii) is located in a region of the surface 442 of the substrate 441 that can be encompassed by a spot size 137 associated with a measurement tool 110. Hence, the substrate 441 with the printed linear array 445 of band-pass filters forms an ICE 440 associated with the target filter spectrum $w_t(\lambda)$.

A precision of the system 400 relative to controlling wavelength and intensity depends on a resolution of the grating 420 and spacing of mirrors on the DLP device 430. In the example illustrated in FIG. 4, the linear array 445 of band-pass filters includes 4 discrete wavelengths, for clarity. It is possible that the 4 discrete wavelengths would become axially blurred due to axial resolution(s) of the grating 420 and/or DLP device 430. Another factor that contributes to the resolution of the system 400 is how well one can avoid aliasing on the substrate 441 with the beam steering element 430 used to print the linear array 445 of band-pass filters.

Components described above can be used to print sets of band-pass spectral filters 145—described above in connection with FIG. 1—and 145-2 described above in connection with FIG. 2A.

In some implementations, an actuator 432 for controlling yaw of the DLP device 430 can be activated. The yaw-controlling actuator rotates the DLP device 430 around the y-axis, such that light of a specific wavelength (selected by activating an appropriate column of the DLP device 430) that is redirected towards the surface 442 of the substrate 441 will be offset along the x-axis relative to an un-rotated configuration. The foregoing offset along the x-axis of the light of a specific wavelength that is redirected towards the surface 442 of the substrate 441 also can be accomplished using another actuator (not shown in FIG. 4) for controlling yaw of the dispersive element 420. In either of these ways, the DLP device can place a band-pass filter of a specified wavelength at a desired position along the x-axis on the surface 442 of the substrate 441 and can shape the band-pass filter of the specified wavelength according with a desired x-y shape. Thus, the system 400 also can be used to print sets of band-pass spectral filters 145-3 (described above in connection with FIG. 2B), 145-4 (described above in connection with FIG. 2C), 145-5 (described above in connection with FIG. 2D), 145-6 (described above in connection with FIG. 2E), and 145-7 (described above in connection with FIG. 2F.)

Figure 5A:
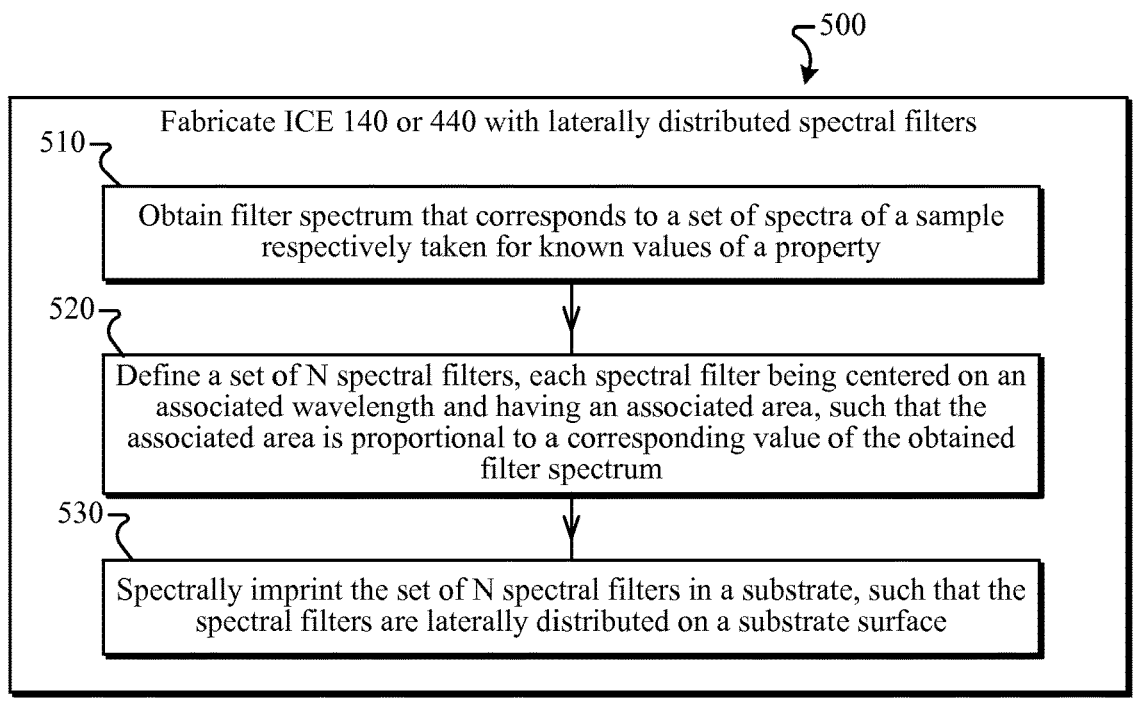
FIG. 5A is a flow chart showing an example of a process for fabricating an ICE that has a set of laterally-distributed spectral filters.

FIG. 5A is a flow chart showing an example of a process 500 for fabricating an ICE that has a set of laterally-distributed spectral filters. In some implementations, the ICE with laterally-distributed spectral filters that is fabricated in accordance with the process 500 can be integrated with the measurement tool 110 used in the system 100 for measuring a property of a sample.

At 510, a filter spectrum associated with a property of a sample is obtained. In some implementations the sample is crude petroleum, gas, water, or other wellbore fluids, for instance. The obtained filter spectrum w(λ) 150 corresponds to a set of spectra 135'-j, where j=1–N, of the sample, where the spectra 135'-j were respectively taken for known values of a property of the sample. The property can be any one of multiple physical or chemical properties of the sample including concentration of a given substance in the sample, a gas-oil-ratio (GOR), pH value, density, viscosity, etc.

At 520, a set of spectral filters that is spectrally equivalent to the obtained filter spectrum is selected. Later in the process 500, the selected set of spectral filters is spatially encoded in a substrate based on a lateral distribution. For a non-transparent substrate, a set of band-pass spectral filters 145 can be selected, such that each of the band-pass spectral filters is centered on an associated wavelength and has an associated area, where the associated area is proportional to a corresponding value of the obtained filter spectrum. Alternatively, a set of band-stop spectral filters can be spectrally imprinted in a transparent substrate. Similar operations can be performed at 520 and 530 when the spectral filters of the set 145 are band-pass or band-stop spectral filters. For clarity, the operations performed at 520 and 530 are described below in terms of a set of band-pass spectral filters.

Constraints to be accounted for when optimizing a size, shape and lateral distribution of the band-pass spectral filters are (i) a number of the band-pass filters in the set, and (ii) a given spot size used in a measurement tool in which the ICE that includes the set of band-pass spectral filters will be used. Such an optimization is carried out to minimize a difference between the spot size and a total area of the band-pass spectral filters of the set. For instance, once the number N of band-pass spectral filters is selected, the relative areas of the N band-pass spectral filters is fixed by the filter spectrum $w(\lambda)$, generally in accordance with Equation 1. Additionally, once the spot size is known, (a) the shape of individual band-pass spectral filters, and (b) their lateral distribution within the spot size are iterated to minimize a difference between the spot size and the total area of the N band-pass spectral filters of the set.

In some implementations, when selecting the set of band-pass spectral filters certain limitations of a printing system used to spatially encode the selected set of band-pass spectral filters should be accounted for. In some printing systems, shapes of individual band-pass spectral filters can only be rectangular. In some printing systems, a lateral resolution thereof establishes an upper threshold to the number N of band-pass spectral filters that may be printed as part of a set, etc. Additionally or conversely, in some cases, the upper threshold to the number N of band-pass spectral filters that may be printed as part of a set is established by resolution of film onto which the set of N band-pass spectral filters is printed.

Various algorithms can be used to select, from a number of sets of band-pass spectral filters, one that satisfies predetermined constraints. In some implementations, an initial guess of values of the size, shape and lateral distribution of the band-pass spectral filters is made that is constrained by number of filters and spot size. A simulation is performed to find a resulting difference between the spot size and the total area of the N band-pass spectral filters of the set associated with the current guessed values of the parameters. New parameter values are computed in an attempt to find parameters for which a difference between the spot size and the total area of the N band-pass spectral filters of the set is minimized. Any conventional multivariate minimization scheme, such as conjugate gradient, steepest descent, Levenberg-Marquart, and the like, can be used.

In this manner, a set of N band-pass spectral filters, which simultaneously spectrally matches the obtained filter spectrum $w(\lambda)$ 150 and minimizes a difference between the spot size and the total area of the N band-pass spectral filters, can be designed by iteratively varying size, shape and lateral distribution of the band-pass spectral filters in order to refine the final set. Multiple examples of shapes of band-pass spectral filters and lateral distributions thereof are described in detail above in connection with FIGS. 1 and 2A-2F.

At 530, the selected set of spectral filters is spectrally imprinted in a substrate, such that the spectral filters of the set are laterally-distributed on a surface of the substrate. In some implementations, when the spectral filters are band-pass filters, regions of the substrate that are not spatially encoded are non-transmissive to light in a particular wavelength range. In other implementations, when the spectral filters are band-stop filters, regions of the substrate that are not spatially encoded are transmissive to the light in the particular wavelength range.

For example, the system 400 can be used to encode (print) a set of band-pass spectral filters. In this case, a band-pass spectral filter $B(\lambda_j)$ having a center wavelength $\lambda_j$ is spectrally imprinted by exposing a portion of a substrate (e.g., vis or IR-sensitive photographic film) with light having an appropriate wavelength. For some photographic films, the appropriate wavelength is the center wavelength $\lambda_j$ of the band-pass spectral filter $B(\lambda_j)$. The exposed portion of the substrate has an area and a shape that have been determined at 520.

As another example, stripes of selectively absorbing (or reflecting) materials can be deposited on a transparent substrate, such that the deposited stripes are laterally-distributed approximately like a target set of spectral filters that is equivalent to the desired filter spectrum $w(\lambda)$ (e.g., as shown in FIGS. 1 and 2A). Individual ones of the deposited stripes can be custom trimmed (e.g., using a laser trimming process), such that the trimmed stripes match corresponding spectral filters of the target set. For example, for a set of band-stop filters that are laterally-distributed like in FIG. 2A, a laser can be used to cut a smidge of the top of a given deposited stripe (e.g., $2^{nd}$ from right) to bring closer an area of the given stripe to the area of the corresponding spectral filter of the target set. In this manner, a set of "approximate" band-stop spectral filters can be deposited on a transparent substrate, using a deposition process having a 4 sigma precision with respect to the target set of spectral filters. Subsequently, the deposited band-stop spectral filters of the "approximate" set can be trimmed to obtain trimmed band-stop spectral filters that form a set that matches the target set with a precision of 6 or 7 sigma. Conventional trimming processes, such as laser trimming for tuning resistor networks, can be used to trim stripes deposited using a low-precision deposition process.

In this manner, an ICE 140 can be fabricated using the process 500 to include a set of laterally-distributed spectral filters that is spectrally equivalent to the obtained filter spectrum $w(\lambda)$ 150. The ICE 140 fabricated in this manner can be used in the measurement tool 110 to measure a value of a property of a sample, where the property is associated with the filter spectrum $w(\lambda)$ 150 to which the set of laterally-distributed spectral filters of the ICE 140 is equivalent.

The process 500 can be used in an iterative manner to fabricate each of the multiple sets of laterally-distributed spectral filters 145-$ij$ of the ICE 140-$M_1$ (or 140-$M_2$), which is described above in connection with FIG. 3A (or FIG. 3B.) The different sets of distributed spectral filters imprinted in the ICE 140-$M_1$ (or 140-$M_2$) are spectrally equivalent to respective filter spectrums $w_{ij}(\lambda)$ corresponding to different properties (i,j) of a sample. Another fabrication process can be used to fabricate an ICE 140-M1 (or 140-M2) as described below. Sets of equal-length absorbing (or reflecting) stripes are deposited in regions Pij of a first surface 142 of a transparent substrate, such that the stop-bands corresponding to the deposited stripes are laterally-distributed like in FIGS. 1 and 2A. Additionally, the back side of the transparent substrate can be coated with a non-transmitting layer, e.g., a metal or ink layer. In order to measure desired properties of a sample, lengths of the stripes of corresponding sets 145-$ij$ deposited in regions Pij are trimmed, such that the sets 145-$ij$ of trimmed stripes are spectrally equivalent to respective filter spectrums $w_{ij}(\lambda)$ corresponding to the desired properties (i,j) of the sample. Apertures, corresponding to the regions Pij that have a set 145-$ij$ of trimmed stripes, are opened in the non-transmitting layer on the backside of the substrate to transmit respective processed (filtered) instances of the modified spectrum 135.

An ICE with laterally-distributed spectral filters that is designed and fabricated based on processes described above can go through a design-level calibration process. High reproducibility of the described printing processes allows for ICEs with a set of laterally-distributed spectral filters to be substantially identical. In this manner, only one ICE from among ICEs with the same set of laterally-distributed spectral filters needs to be calibrated, because the calibration results can be applied to the rest of the ICEs with of the same set of laterally-distributed spectral filters, regardless of fabrication batch.

Figure 5B:
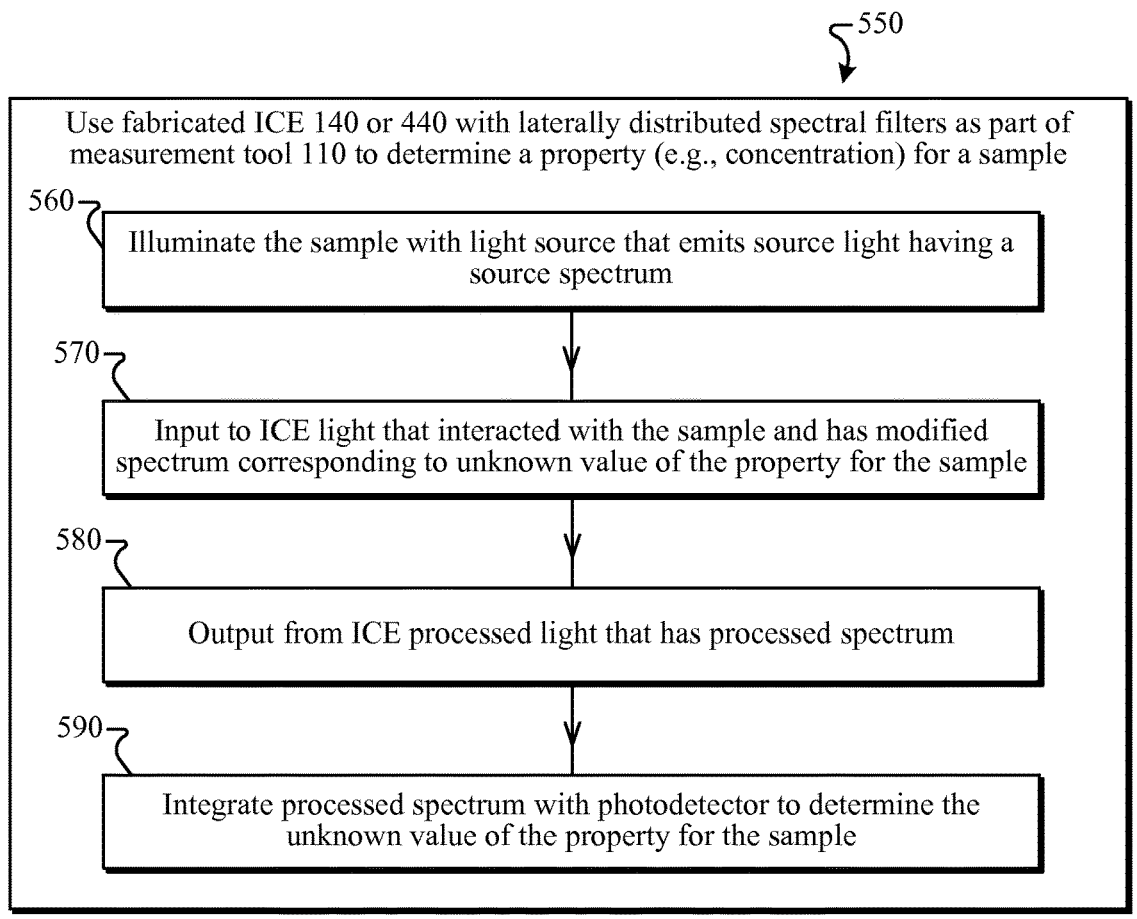
FIG. 5B is a flow chart showing an example of a process for measuring a property of a sample using an ICE that has a set of laterally-distributed spectral filters.

FIG. 5B is a flow chart showing an example of a process 550 for measuring a property of a sample using an ICE that has a set of laterally-distributed spectral filters. In some implementations, the process 550 can be performed by the measurement tool 110 as part of the system 100 and will be described as such for the purpose of clarity. For example, the sample 130 can be crude petroleum or other wellbore fluid that is stationary in or flows through the pipe 38.

At 560, the sample 130 is illuminated with a light source 120 that emits source light having a source spectrum $I_0(\lambda)$ 125. The source spectrum $I_0(\lambda)$ 125' can be continuous over a broad wavelength range. For example, the wavelength range can span UV-vis, near-IR, mid-IR and far-IR.

At 570, light that interacted with and was modified by the sample 130 is input to an ICE 140 with laterally-distributed spectral filters. The light modified by the sample has a spectrum $I(\lambda)$ 135' corresponding to an unknown value of the property of the sample 130. The set 145 of laterally-distributed spectral filters is spectrally equivalent to a filter spectrum $w(\lambda)$ 150 over the wavelength range. The filter spectrum $w(\lambda)$ 150 corresponds to a set of spectra of the sample respectively taken for known values of the property.

At 580, processed light is output from the ICE 140. The ICE 140 generates a processed spectrum $P(\lambda)$ 155' by weighing the modified spectrum $I(\lambda)$ 135' with the filter spectrum $w(\lambda)$ 150 to which the ICE 140's set 145 of laterally-distributed spectral filters is equivalent. In this manner, the processed light has a processed spectrum $P(\lambda)=w(\lambda)I(\lambda)$ 155' over the wavelength range.

At 590, the processed spectrum $P(\lambda)$ 155' is integrated with a photodetector 160 over the wavelength range to determine the unknown value c 165' of the property for the sample.

In general, the ICEs with laterally-distributed spectral filters can be used in a variety of applications. As mentioned previously, in some applications, ICEs are used to measure properties of fossil fuel samples in situ, e.g., downhole during oil and gas drilling and/or extraction.

Figure 6:
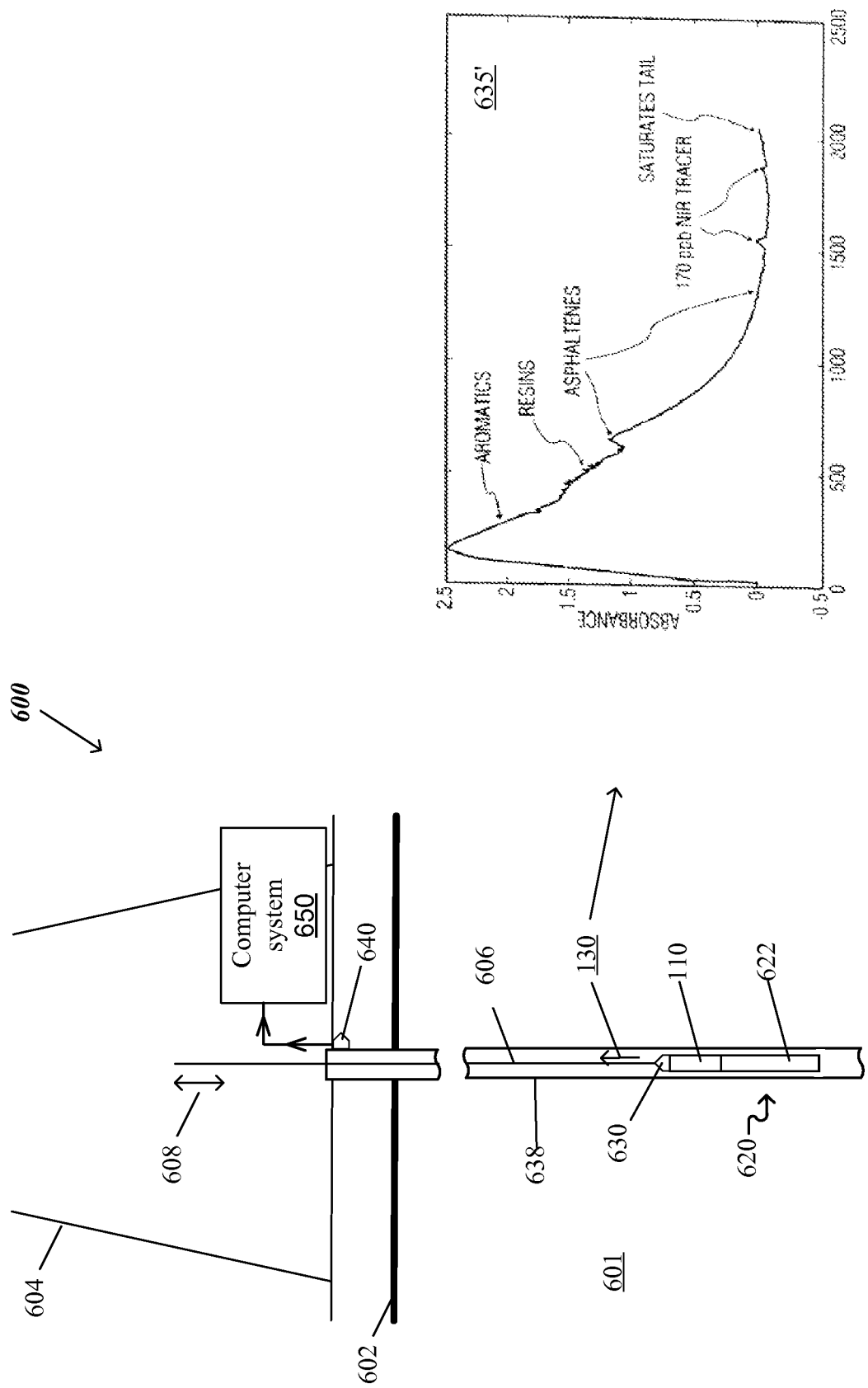
FIG. 6 shows an example of a system for in-situ measuring of crude petroleum, gas, water, or other wellbore fluids, where measurements are performed using the system of FIG. 1.

FIG. 6 shows an example of a system 600 for downhole measurements, where at least some of the measurements are performed using the measurement tool 110 of FIG. 1.

The system 600 includes a rig 604 above the ground surface 602 and a wellbore 638 below the ground surface. The wellbore 638 extends from the ground surface into the earth and generally passes through multiple geologic formations 601. In general, the wellbore 738 contains wellbore fluids 130. In some cases, the wellbore fluids 130 include crude petroleum 130. However, the wellbore fluids 130 may include mud, water or other substances and/or compounds. Moreover, the crude petroleum, gas, water, or other wellbore fluids 130 may be at rest, or may flow toward the ground surface 602, for instance. A tool string 620 is attached to a cable 606 and can be lowered or raised in the wellbore by draw works 608. In general, the tool string 620 includes measurement and logging tools configured to generate and log information about the geologic formations outside of the wellbore 638 and/or about the crude petroleum, gas, water, or other wellbore fluids 130 in the wellbore. In this example, the tool string 620 includes the measurement tool 110 described above in connection with FIG. 1, one or more logging tools 622, and a telemetry transmitter 630. The measurement tool 110 includes an ICE that has a set of laterally-distributed spectral filters and is configured to measure one or more properties of the crude petroleum, gas, water, or other wellbore fluids 130.

In some implementations, the measurement tool 110 determines values of the one or more properties in real time and reports those values instantaneously as they occur in the flowing stream of wellbore fluids 130, sequentially to or simultaneously with other measurement/logging tools 622 of the tool string 620. Measured values (e.g., 165' in FIG. 1) of the one or more properties of the wellbore fluids 130 can be provided (e.g., as detector signal 165) to the telemetry transmitter 630. The latter communicates the measured values to a telemetry receiver 640 located above the ground surface 602. The transmitter 630 and the receiver 640 can communicate through wires or wirelessly. The measured values of the one or more properties of the wellbore fluids 130 received by the receiver 640 can be logged and analyzed by a computer system 650 associated with the rig 604. In this manner, the values provided by the measurement tool 110 can be used to generate useful physical and chemical information about the wellbore fluids 130 in the wellbore 638.

As described above, a light source included in the measurement tool 110 illuminates the wellbore fluids 130 with light source that can extend over the UV-vis and IR spectral ranges (e.g., in the wavelength range from 0.2-2.5 μm.) The source light is modified by the interaction with the wellbore fluids 130 to produce a modified spectrum 635'. In this manner, the modified spectrum 635' contains information about one or more properties of the wellbore fluids. In order to extract such information from the modified spectrum 635', light that interacted with the wellbore fluids is directed to an ICE (e.g., 140, 340, 140-M1, 140-M2) that has a set (e.g., 145 or 345, and the like) of laterally-distributed spectral filters for processing. The ICE weighs the modified spectrum 635', with a filter spectrum (e.g., 150 or 350, and the like) to which the set of laterally-distributed spectral filters is equivalent, and generates a processed spectrum corresponding to a property associated with the filter spectrum. A value of the property is determined by a photodetector that integrates the processed spectrum.

Properties of the wellbore fluids 130 that can be related to the modified spectrum 635' through the filter spectrums associated with the ICEs described herein are concentrations of one of asphaltene, saturates, resins, aromatics; solid particulate content; hydrocarbon composition and content; gas composition C1-C6 and content: $CO_2$, $H_2S$ and correlated PVT properties including GOR, bubble point, density; a petroleum formation factor; viscosity; a gas component of a gas phase of the petroleum; total stream percentage of water, gas, oil, solid articles, solid types; oil finger printing; reservoir continuity; oil type; and water elements including ion composition and content, anions, cations, salinity, organics, pH, mixing ratios, tracer components, contamination, or other hydrocarbon, gas, solids or water property.

The measurement tool 110 may be deployed as part of a measurement while drilling tool, a wireline based formation evaluation tool, (i) in an autonomous mode where data and meta-data is written to memory or sent via various telemetry methods, (ii) in a permanent installation mode where the sensor is part of the production tubular telemetry or is part of a smart well completion and data network, electric or fiber and may or may not be retrievable. Surface applications of the measurement tool 110 may include water monitoring and gas and crude transportation and processing.

Some embodiments have been described in detail above, and various modifications are possible. While this specification contains many specifics, these should not be construed as limitations on the scope of what may be claimed, but rather as descriptions of features that may be specific to particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments.

Other embodiments fall within the scope of the following claims.

What is claimed is:

1. A system comprising:
a light source that, during operation of the system, illuminates a sample with light having a source spectrum over a wavelength range to obtain light modified by the sample, wherein the light modified by the sample has a modified spectrum over the wavelength range, the modified spectrum corresponding to the sample;
an integrated computational element (ICE) comprising a set of spectral filters spectrally imprinted over a substrate surface and arranged at different lateral positions with respect to and substantially perpendicular to a path of the light modified by the sample, wherein the set of spectral filters is spectrally equivalent to a filter spectrum over the wavelength range, wherein the filter spectrum corresponds to a set of spectra of the sample respectively taken for known values of a property of the sample, wherein each spectral filter in the set is centered on an associated wavelength and has a pre-defined associated area that corresponds to the sample, such that the pre-defined associated area is proportional to an intensity of light of the modified spectrum at the associated wavelength that correlates with an expected intensity of light, at a same associated wavelength, for the sample, wherein the ICE (i) is arranged to receive the light modified by the sample and (ii) outputs processed light that has a processed spectrum over the wavelength range; and
a photodetector optically coupled with the ICE to receive the processed light, wherein the photodetector integrates the processed spectrum over the wavelength range to determine a current value of the property of the sample.

2. The system of claim 1, wherein the substrate surface is non-transparent over the wavelength range, and the spectral filters are band-pass spectral filters.

3. The system of claim 1, wherein the substrate surface is transparent over the wavelength range, and the spectral filters are band-stop spectral filters.

4. The system of any one of claim 1, wherein, when the light modified by the sample is received at the ICE, a spot size encompasses a lateral spatial extent of the set of spectral filters.

5. The system of claim 4, wherein the spectral filters of the set are distributed over the substrate surface of the ICE, such that a difference between the spot size and an area defined by the lateral spatial extent of the set is minimized.

6. The system of claim 4, wherein an area defined by the lateral spatial extent of the set is optimized within the encompassing spot size to increase a flux corresponding to the processed spectrum that reaches the photodetector.

7. The system of claim 1, wherein the spectral filters of the set are distributed over the substrate surface of the ICE in increasing or decreasing order of their respective wavelengths.

8. The system of claim 1, wherein the spectral filters of the set have rectangular shapes with a same width and respective lengths proportional to values of the filter spectrum at corresponding wavelengths, and
are distributed over the substrate surface of the ICE such that a longest spectral filter of the set is in the center of the distribution, and remaining spectral filters of the set are distributed laterally outward from the center in decreasing order of their respective lengths.

9. The system of claim 1, wherein
the spectral filters of the set are shaped as sectors of a circle over the substrate surface, and each of the sectors subtends an angle proportional to a value of the filter spectrum at an associated wavelength.

10. The system of claim 1, wherein the spectral filters of the set are shaped as annular segments with a same width and respective lengths proportional to values of the filter spectrum at corresponding wavelengths, and
are distributed concentrically over the substrate surface.

11. The system of claim 1, wherein the spectral filters of the set have annular shapes with different widths, and
are distributed concentrically over the substrate surface.

12. The system of claim 1, wherein the spectral filters of the set extend from the substrate surface of the ICE through the entire thickness of the ICE.

13. The system of claim 1, wherein the ICE comprises materials that are photosensitive over the wavelength range.

14. The system of claim 1, wherein the set of spectral filters is spectrally imprinted over a predetermined portion of the substrate surface.

15. The system of claim 14, wherein
the ICE comprises one or more additional sets of spectral filters spectrally imprinted over the substrate surface, and
each of the additional sets of spectral filters, is spectrally equivalent to an associated filter spectrum over the wavelength range, such that the associated filter spectrum corresponds to an associated set of spectra of the sample respectively taken for known values of an additional property, wherein each spectral filter in the additional set is centered on an associated wavelength and has an associated area, such that the associated area is proportional to an intensity of light of the modified spectrum at the associated wavelength that correlates with an expected intensity of light, at a same associated wavelength, for the sample, and is spectrally imprinted over an associated other predetermined portion of the substrate surface, such that other predetermined portions of the substrate surface corresponding to the respective additional sets of spectral filters are laterally separated, from each other and from the predetermined portion corresponding to the set of spectral filters, by separations at least a size of a spot size when the light modified by the sample is received at the ICE.

16. A measurement tool comprising:

an optical element comprising a substrate and a plurality of spectral filters supported by the substrate and arranged at different lateral positions with respect to and substantially perpendicular to a path of light to be received from a sample during operation of the measurement tool, each spectral filter formed to transmit or reflect a different subset of wavelengths in a wavelength range, and each spectral filter having a pre-defined respective area that corresponds to the sample exposed to the light from the sample, the pre-defined respective areas being proportional to an intensity of the light received from the sample at a corresponding different subset of the wavelengths in the wavelength range that correlates with an expected intensity of light, at a same corresponding different subset of wavelengths in the wavelength range, for the sample.

17. The measurement tool of claim 16, wherein the wavelength range comprises wavelengths in a range from about 0.2 µm to about 25 µm.

18. The measurement tool of claim 16, wherein the sample comprises wellbore fluids and the property of the sample is a property of the wellbore fluids.

19. The measurement tool of claim 18, wherein the property of the sample is selected from the group consisting of a concentration of a substance in the sample, a pH of the sample, a ratio of concentrations of two different substances in the sample, a density of the sample, and a viscosity of the sample.

20. The measurement tool of claim 16, wherein the area of each spectral filter has a quadrilateral or arcuate shape.

21. The measurement tool of claim 16, wherein the spectral filters comprise band-pass filters.

22. The measurement tool of claim 16, wherein the spectral filters comprise band-stop filters.

23. The measurement tool of claim 16 further comprising:

a light source positioned to illuminate the sample with light having a first spectrum over the wavelength range, wherein the optical element is positioned to receive the light from the sample in response to the illumination, such that the light received from the sample has a second spectrum over the wavelength range, the second spectrum corresponding to the first spectrum modified by the sample; and a detector positioned to receive light from the optical element and produce a signal having a value related to an integrated intensity of the light from the optical element across the wavelength range, wherein the signal value corresponds to a value of the property of the sample.

24. The measurement tool of claim 23, wherein the spectral filters are provided within an illuminated area of the optical element, and the measurement tool further comprises one or more additional optical elements configured to shape the light at the optical element to span the illuminated area.

25. The measurement tool of claim 23 further comprising a transparent element positioned in a path of the light between the light source and the sample.

26. The measurement tool of claim 25, wherein the optical element is positioned to receive light reflected from an interface between the sample and the transparent element.

27. A method, comprising:

placing a measurement tool in a wellbore, wherein the measurement tool comprises:

an optical element comprising a substrate and a plurality of spectral filters supported by the substrate and arranged at different lateral positions with respect to and substantially perpendicular to a path of light to be received from a sample during operation of the measurement tool, each spectral filter formed to transmit or reflect a different subset of wavelengths in a wavelength range, and each spectral filter having a pre-defined respective area that corresponds to the sample exposed to the light from the sample, the pre-defined respective areas being proportional to an intensity of the light received from the sample at a corresponding different subset of the wavelengths in the wavelength range that correlates with an expected intensity of light, at a same corresponding different subset of wavelengths in the wavelength range, for the sample;

a light source positioned to illuminate the sample with light having a first spectrum over the wavelength range, wherein the optical element is positioned to receive the light from the sample in response to the illumination, such that the light received from the sample has a second spectrum over the wavelength range, the second spectrum corresponding to the first spectrum modified by the sample; and a detector positioned to receive light from the optical element and produce a signal having a value related to an integrated intensity of the light from the optical element across the wavelength range, wherein the signal value corresponds to a value of the property of the sample; and determining the value of a property of a sample in the wellbore using the measurement tool.

* * * * *

UNITED STATES PATENT AND TRADEMARK OFFICE
CERTIFICATE OF CORRECTION

PATENT NO. : 10,718,881 B2  
APPLICATION NO. : 14/900107  
DATED : July 21, 2020  
INVENTOR(S) : David L. Perkins, Li Gao and Michael T. Pelletier It is certified that error appears in the above-identified patent and that said Letters Patent is hereby corrected as shown below:

On the Title Page

IN THE ABSTRACT:  
On page 2, last line, delete "well-bore" and insert --wellbore--

In the Claims

Claim 4, in Column 22, Line 16, after --system-- delete "of any one"

Signed and Sealed this  
Thirteenth Day of October, 2020

Andrei Iancu  
*Director of the United States Patent and Trademark Office*